US012343763B2

(12) United States Patent
Johnson et al.

(10) Patent No.: US 12,343,763 B2
(45) Date of Patent: Jul. 1, 2025

(54) AUTOMATED GOLF BALL SORTING APPARATUS WITH IMAGE RECOGNITION TECHNOLOGY

(71) Applicant: Sort It Out Solutions, LLC, Dallas, TX (US)

(72) Inventors: Dirk Johnson, Dallas, TX (US); Kelven Hua, Richardson, TX (US); Trenton Burns, Richardson, TX (US); Kolby Brubaker, Richardson, TX (US); Frank Hartman, Richardson, TX (US); Vin La, Richardson, TX (US); Jacob Garcia, Richardson, TX (US)

(73) Assignee: Sort It Out Solutions, LLC, Dallas, TX (US)

( * ) Notice: Subject to any disclaimer, the term of this patent is extended or adjusted under 35 U.S.C. 154(b) by 0 days.

(21) Appl. No.: 18/511,447

(22) Filed: Nov. 16, 2023

(65) Prior Publication Data

US 2024/0157401 A1 May 16, 2024

Related U.S. Application Data

(60) Provisional application No. 63/384,050, filed on Nov. 16, 2022.

(51) Int. Cl.
*B07C 5/34* (2006.01)
*B07C 5/342* (2006.01)
(Continued)

(52) U.S. Cl.
CPC .......... *B07C 5/3412* (2013.01); *B07C 5/3422* (2013.01); *B07C 5/362* (2013.01); *B07C 5/38* (2013.01)

(58) Field of Classification Search
CPC ..... B07C 5/3412; B07C 5/342; B07C 5/3422; B07C 5/362; B07C 2501/0045;
(Continued)

(56) References Cited

U.S. PATENT DOCUMENTS

| | | | | |
|---|---|---|---|---|
| 4,841,945 A * | 6/1989 | Braden | A63B 69/406 | 124/78 |
| 6,462,812 B1 * | 10/2002 | Heene | A63B 45/02 | 382/141 |
| 2022/0219048 A1 | 7/2022 | Kuusisto | | |

FOREIGN PATENT DOCUMENTS

| | | | |
|---|---|---|---|
| JP | 2013034496 A | 2/2013 | |
| JP | 3237533 U * | 5/2022 | G01N 21/85 |

(Continued)

OTHER PUBLICATIONS

Kim; Byeong, "Baseball Pitching Machine for Recovery Device" (English Translation), Sep. 29, 2017, patents.google.com (Year: 2017).*

(Continued)

*Primary Examiner* — Michael McCullough
*Assistant Examiner* — Molly K Devine
(74) *Attorney, Agent, or Firm* — Schultz & Associates, P.C.

(57) ABSTRACT

A sorting apparatus for a set of golf balls includes a frame, a ball hopper, a plurality of sort bins, a chain driven elevator, a motor, a set of ball cups, a camera, a gravity fed sorter divider, a set of ball gates, and a controller. The controller activates the motor, monitors an image from the camera for recognition of a printed golf ball marking, and activates a ball gate. A selected golf ball is directed to a corresponding sort bin by the ball gate.

26 Claims, 22 Drawing Sheets

(51) Int. Cl.
*B07C 5/36* (2006.01)
*B07C 5/38* (2006.01)

(58) Field of Classification Search
CPC ..... A63B 47/002; A63B 47/008; A63B 47/02; A63B 47/025; A63B 57/00; A63B 57/0006
USPC .......................... 209/3.3, 552, 566, 652, 657
See application file for complete search history.

(56) References Cited

FOREIGN PATENT DOCUMENTS

| | | | | | |
|---|---|---|---|---|---|
| JP | 7078236 | B1 | | 5/2022 | |
| KR | 101632414 | B1 | | 6/2016 | |
| KR | 200484615 | Y1 | * | 9/2017 | ........... A63B 47/021 |

OTHER PUBLICATIONS

Hirose; Tomita, "Ball Sorter" (English Translation), May 20, 2022, worldwide.espacenet.com, (Year: 2022).*

* cited by examiner

600

AUTOMATED GOLF BALL SORTING APPARATUS WITH IMAGE RECOGNITION TECHNOLOGY

CROSS-REFERENCE TO RELATED APPLICATIONS

This application claims priority benefit from U.S. Provisional Application No. 63/384,050, filed on Nov. 16, 2022. The patent application identified above is incorporated here by reference in its entirety to provide continuity of disclosure.

FIELD OF THE INVENTION

The present invention relates generally to the field of sports equipment, and more specifically, to an automated system for sorting golf balls based on various parameters such as size, weight, brand, type, and condition.

BACKGROUND OF THE INVENTION

Golf is a popular sport played by millions of people worldwide. A key component of the game is the golf ball, which comes in various brands, types, and conditions. Golf facilities, such as driving ranges and golf clubs, often accumulate a large number of golf balls that need to be sorted for reuse or sale. Manual sorting of these balls is labor-intensive, time-consuming, and prone to errors.

The exact number of used golf balls sorted by an average practice range per year is not readily available. However, the number of balls a golfer uses at the range varies but can range between 50-100 balls during a practice session. Considering the number of golfers and frequency of their visits, a busy driving range could see hundreds of golfers in a day, each hitting dozens of balls. Over a year, this could easily add up to hundreds of thousands, if not millions, of golf balls that need to be collected, cleaned, and sorted.

Practice ranges typically use a combination of manual and automated methods to sort used golf balls. In practice, most driving ranges use ball collector carts and tractors to retrieve all the golf balls that have been hit by players. The collected golf balls are cleaned using a system like the NetLoadSort, which cleans the balls in one or two passes, reviving their appearance. The balls are then sorted by size, brand, and condition.

Previous approaches for sorting golf balls have typically involved manual sorting or simple mechanical sorting mechanisms. Manual sorting requires a significant number of people and takes a great amount of time to accomplish. Even so, manual sorting is error prone. Mechanical sorting machines have been used to automate the sorting process to some extent. However, the prior art machines often lack the ability to accurately identify golf balls based on specific characteristics, such as printed markings or type.

Prior art mechanical sorting machines also are typically large and complex, and so prone to failure. Likewise, these machines may also be limited in their ability to reliably sort the golf balls and often are also too slow to be useful. Furthermore, prior art sorting machines often lack the ability to handle a large volume of balls efficiently and so are not practical for commercial use.

For example, U.S. Publication No. 2022/0219048 to Kuusisto discloses a golf ball identification system which moves golf balls vertically downward through a pipe. The pipe expands into a plenum which includes claws for allowing golf balls to pass into an identification area. A rotating pipe is provided to sort the golf balls. Kuusisto also discloses a rotating plate for identifying golf balls. However, the mechanisms disclosed by Kuusisto are complex and do not provide for high-speed sorting. Kuusisto also fails to describe how the machine vision system operates to identify or efficiently classify golf balls into groups.

Another example is Japan Publication No. JP2013034496A to Shimono. Shimono discloses a golf ball sorting machine which can identify scratches on golf balls using a light and a photographing means, which divides the picture into a plurality of pixels for flaw determination. The number of flaws in each golf ball is determined and a decision is made as to whether or not the golf ball is defective or not. Shimono also generally discloses a sorting means to remove golf balls from a conveyor belt if they are defective. However, the sorting means does not provide a way to track the balls being sorted. Moreover, the sorting machine disclosed is only capable of sorting for two kinds of balls, defective and not defective.

Korea Publication No. KR101632414B1 to Moonwooart Co Ltd. also discloses a golf ball sorting machine. This machine includes a conveyor that raises golf balls to a certain height and then bounces them to determine whether or not they are defective. While simple in concept, the machine disclosed by Moonwooart is not highly accurate or fast enough to accommodate high-speed commercial applications, such as driving ranges.

There is, therefore, a need for an improved golf ball sorting system that can automatically sort golf balls based on multiple parameters, handle a large volume of balls, and operate efficiently, accurately and reliably.

SUMMARY OF THE INVENTION

The present invention provides an automated golf ball sorting system designed to address the aforementioned needs. The system includes a hopper conveyor assembly for inputting golf balls, a control system for classifying the balls based on various parameters, and a sorter assembly for categorizing the balls into different groups based on the detected parameters.

The advantages of the present invention will become apparent from the following detailed description of the preferred embodiment thereof, taken in conjunction with the accompanying drawings. The invention, in its broader aspects, is not limited to the specific details, representative devices and methods, and illustrative examples shown and described. It should be understood that various modifications, substitutions, and alterations could be made without departing from the spirit and scope of the invention.

BRIEF DESCRIPTION OF THE DRAWINGS

In the detailed description of the preferred embodiments presented below, reference is made to the accompanying drawings.

DETAILED DESCRIPTION OF THE INVENTION

In the description that follows, like parts are marked throughout the specification and figures for the same numerals. The figures are not necessarily drawn to scale and may be shown in exaggerated or generalized form in the interest of clarity and conciseness. Unless otherwise noted, all tolerances and uses of the terms "about" and "approximately" indicate plus or minus 20%.

Figure 1A:
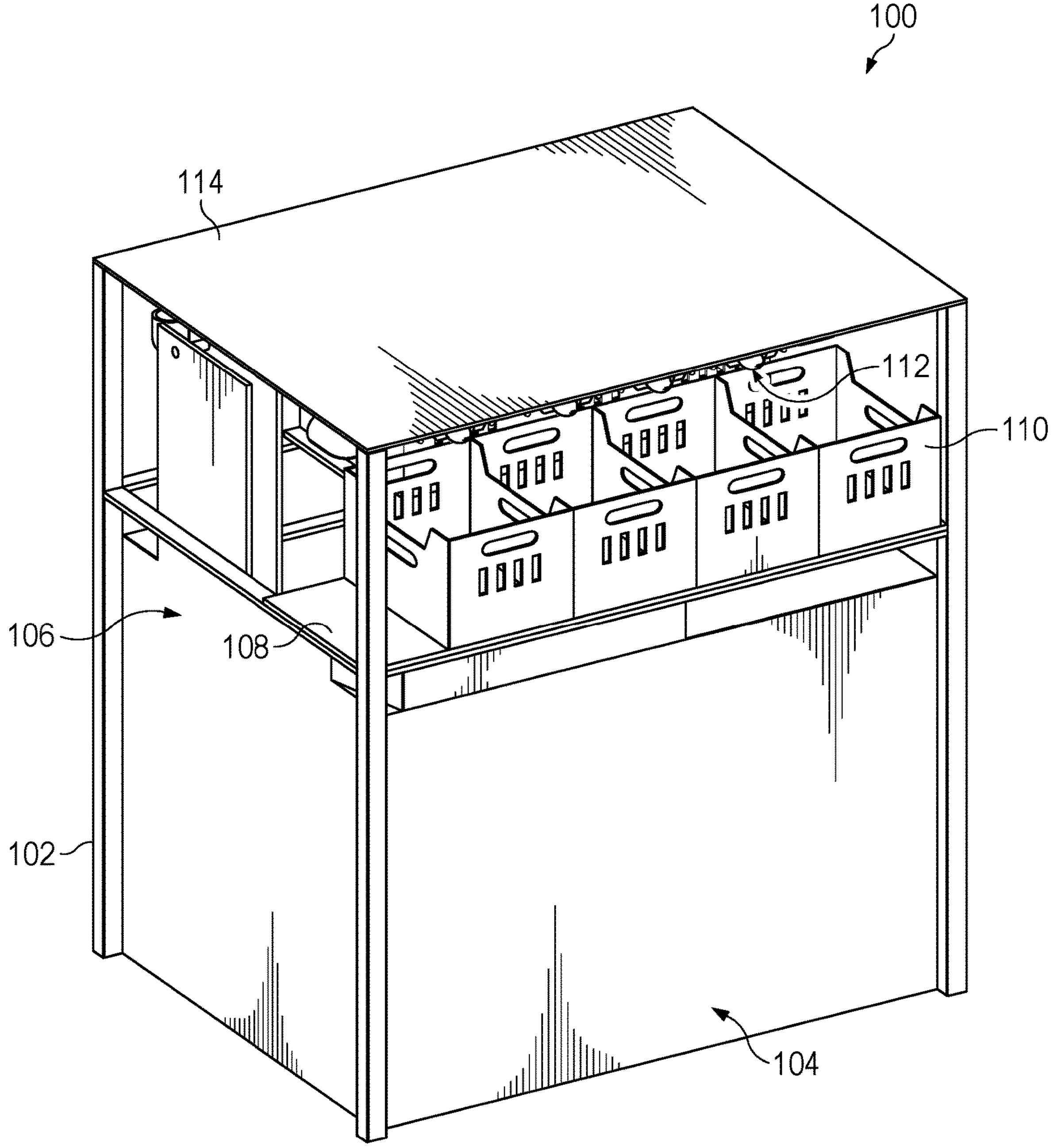
FIG. 1A is a perspective view of a preferred embodiment of a sorter.
Figure 1B:
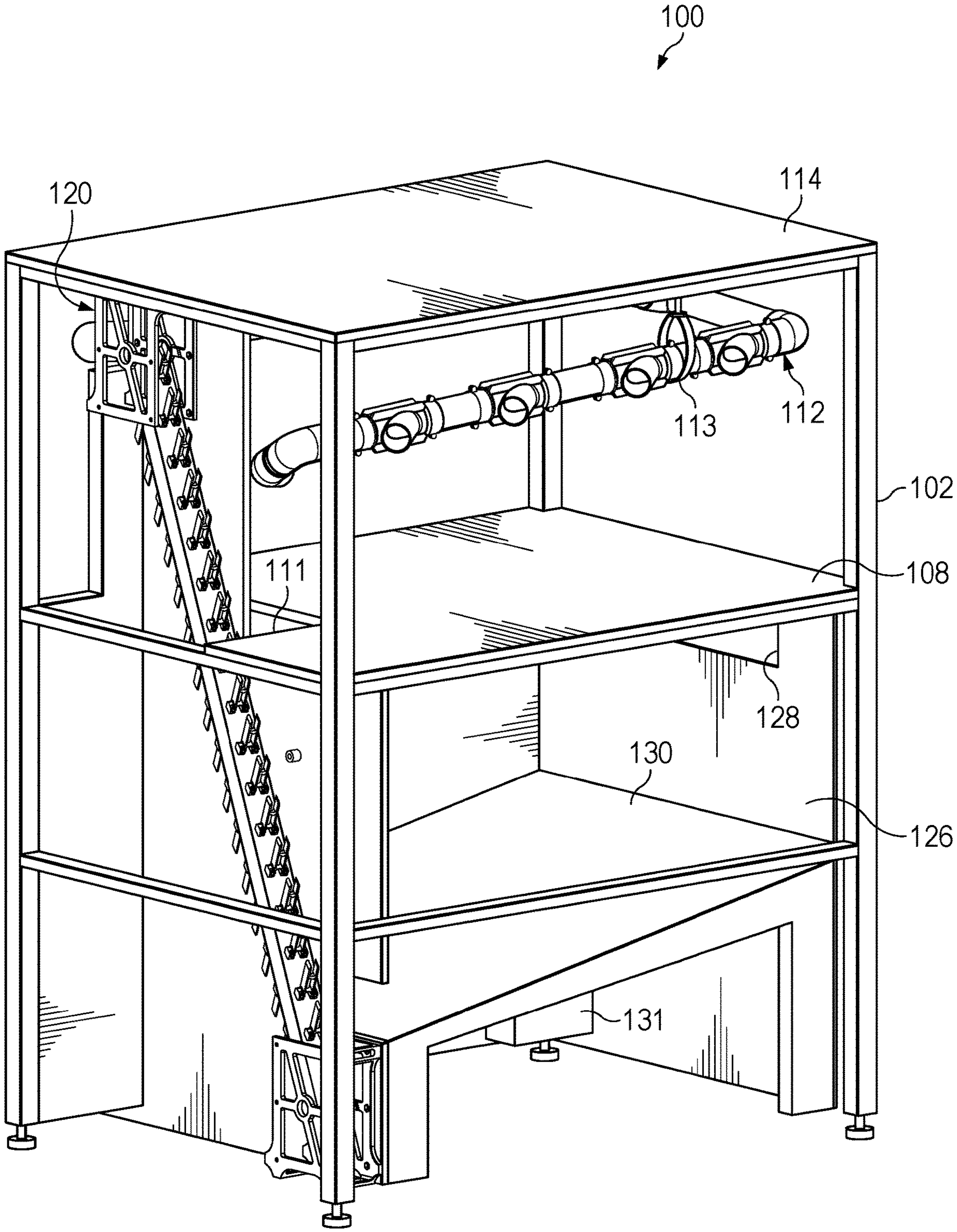
FIG. 1B is a cutaway perspective view of a preferred embodiment of a sorter.

Referring to FIGS. 1A and 1B, sorter 100 will be further described. Sorter 100 includes support frame 102. Support frame 102 is generally a rectangular box for supporting the various structures of the invention by way of shelves, as will be further described. Support frame 102 is rigidly attached to hopper base assembly 104. In a preferred embodiment, hopper base assembly 104 supports watertight control box 131, capable of enclosing and encapsulating the various batteries and electrical components necessary to operate the system.

Support frame 102 further rigidly supports hopper conveyor assembly 106, as will be further described.

Support frame 102 rigidly supports shelf 108. Shelf 108 includes return entrance 111 adjacent the conveyor assembly. Shelf 108 slidingly supports sort bins 110. In a preferred embodiment, there are seven sort bins used to contain identified golf balls. The bins are separated by "T" slots (not shown) which may be labeled to correspond with each bin. Support frame 102 further supports top cover 114 and bottom cover 117. Top cover 114 is removable and rigidly supports sorter assembly 112, as will be further described. The bottom cover supports the control box and seals the base of the sorter.

Figure 1C:
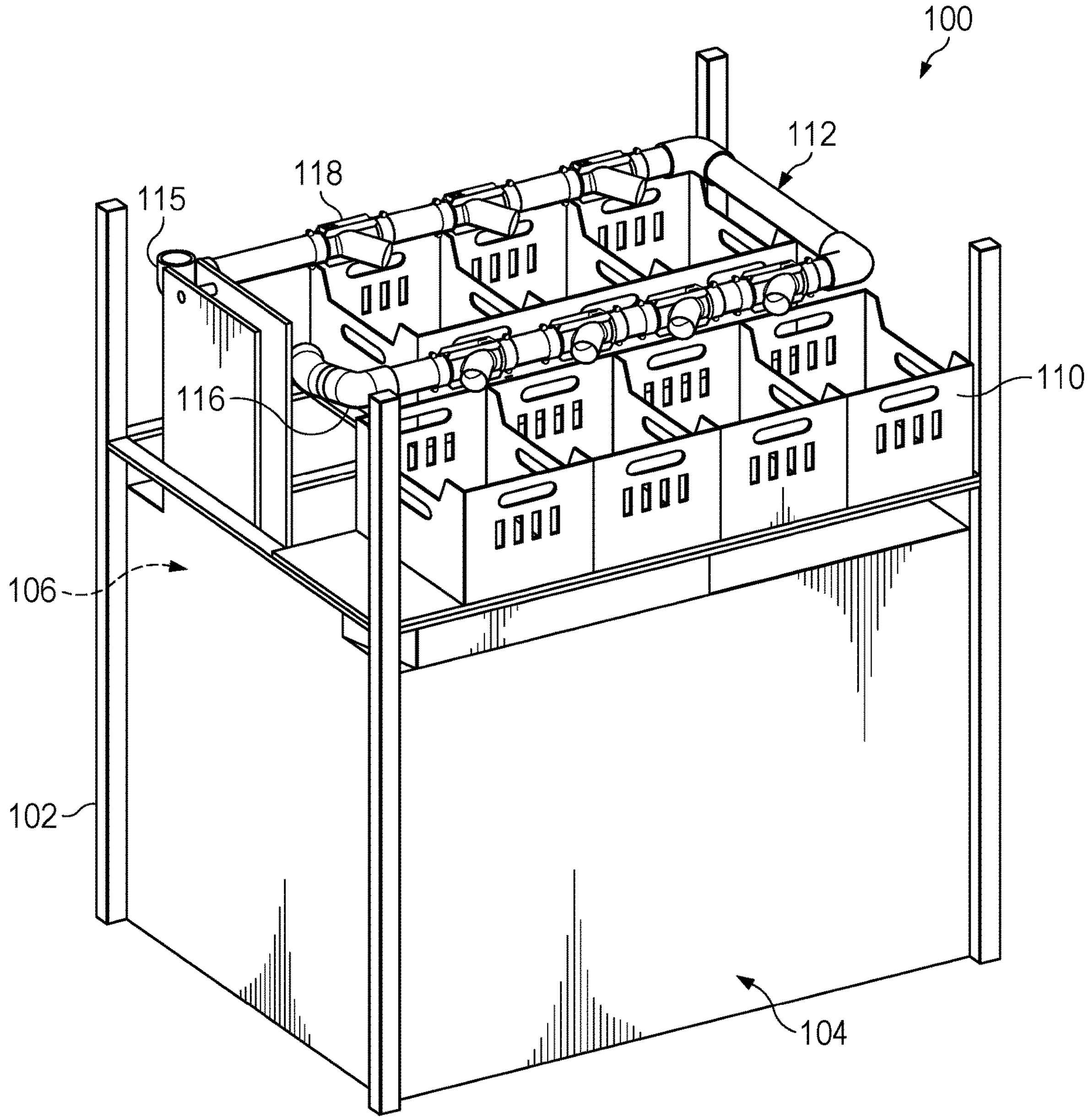
FIG. 1C is a cutaway perspective view of a preferred embodiment of a sorter.

Referring also to FIG. 1C, sorter assembly 112 is attached by appropriate hangers 113 to the bottom side of top cover 114. In this way when the top cover is removed, sorter assembly 112 may be easily exposed to clear machine jams. Sorter assembly 112 includes inlet elbow 115 adjacent hopper conveyor assembly 106 and outlet elbow 116. Sorter assembly 112 further includes a set of ball gates 118, as will be further described.

Figure 1D:
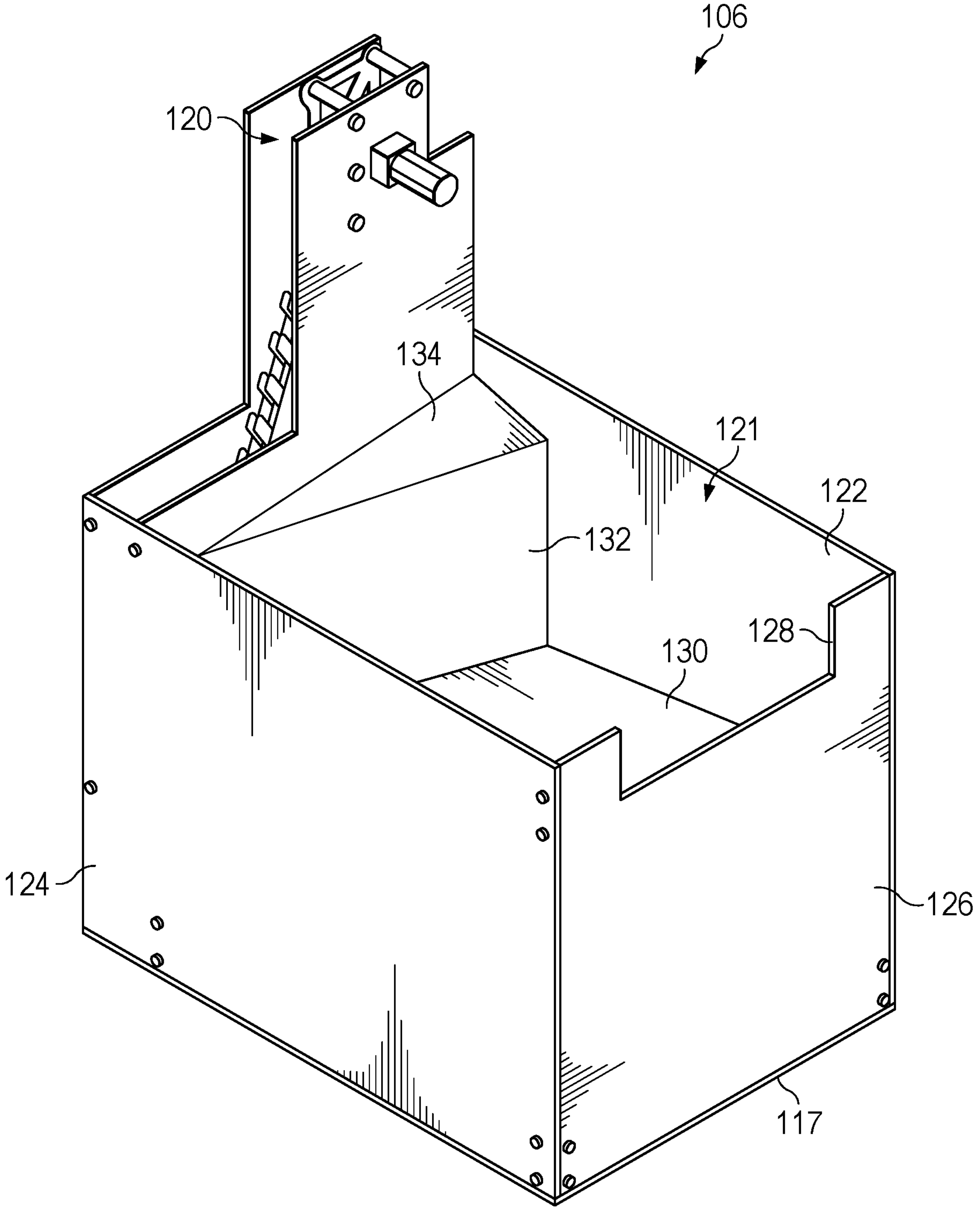
FIG. 1D is a detail isometric view of a preferred hopper conveyor assembly.

Referring also to FIG. 1D, hopper conveyor assembly 106 will be further described.

Hopper conveyor assembly 106 includes conveyor assembly 120 rigidly supported by wall 122 and wall 124. Wall 122 and wall 124 are rigidly connected by wall 126 opposite conveyor assembly 120 and form hopper 121. Hopper 121 is further bounded by guide wall 132 and guide wall 134. Guide wall 134 includes a downward slope toward the conveyor entrance of about 3°. Guide wall 132 also includes an inward angle toward the conveyor entrance of about 3°. Hopper 121 is further bounded by floor 130. Floor 130 includes a slope downward toward guide wall 132 of about 3°.

Wall 126 further includes access slot 128. Access slot 128 is used to receive golf balls into the hopper, as will be further described.

In use, golf balls are inserted into sorter 100 through access slot 128 where they enter hopper 121 and are moved by gravity feed across floor 130 and guided guide wall 132 toward conveyor assembly 120, as will be further described. Conveyor assembly 120 raises each golf ball, about 5 feet, at an angle of about 70° to horizontal to inlet elbow 115. The golf balls enter inlet elbow 115 and traverse sorter assembly 112, passing each ball gate 118 and exiting either through a single ball gate 118, to be collected in a single sort bin 110, or through outlet elbow 116, through return entrance 111, to return to hopper 121.

In a preferred embodiment, hopper 121 is capable of holding approximately 2,800 golf balls. The conveyor assembly and sorter assembly together are capable of processing about one golf ball per second with an accuracy surpassing 90%. Each of sort bins 110 preferably is capable of holding about 300 golf balls.

In a preferred embodiment, each of walls 122, 124 and 126 as well as guide wall 132, guide wall 134 and floor 130 can be manufactured from 20-gauge polished aluminum, stainless steel, galvanized tin, or an appropriate rigid fiberboard.

Figure 2A:
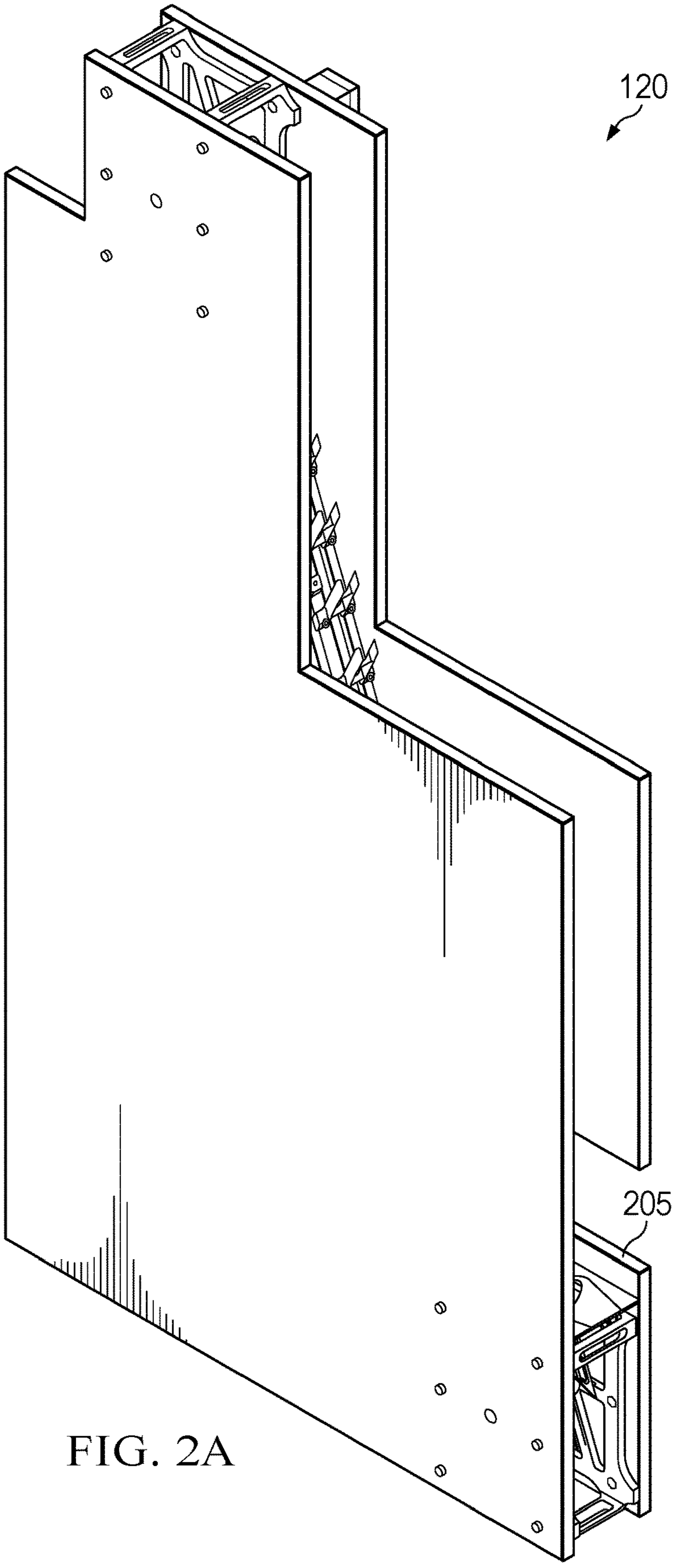
FIG. 2A is an isometric view of preferred conveyor assembly.

Referring then to FIG. 2A, conveyor assembly 120, will be further described. Conveyor assembly 120 is comprised of panel 204 and panel 202. Both panels are generally flat, parallel and are formed of a rigid material such as 20-gauge stainless steel or fiberboard.

Panel 204 includes conveyor entrance 205 and access slot 207, as will be further described. Likewise, panel 202 includes access slot 209, as will be further described.

Panel 204 further includes camera mount stanchion 214 centrally positioned and perpendicular to the panel and centrally positioned above ball roller 220. Camera mount stanchion 214 operatively supports camera 212, which is focused on advancing golf balls in the ball platforms, as will be further described.

Figure 2B:
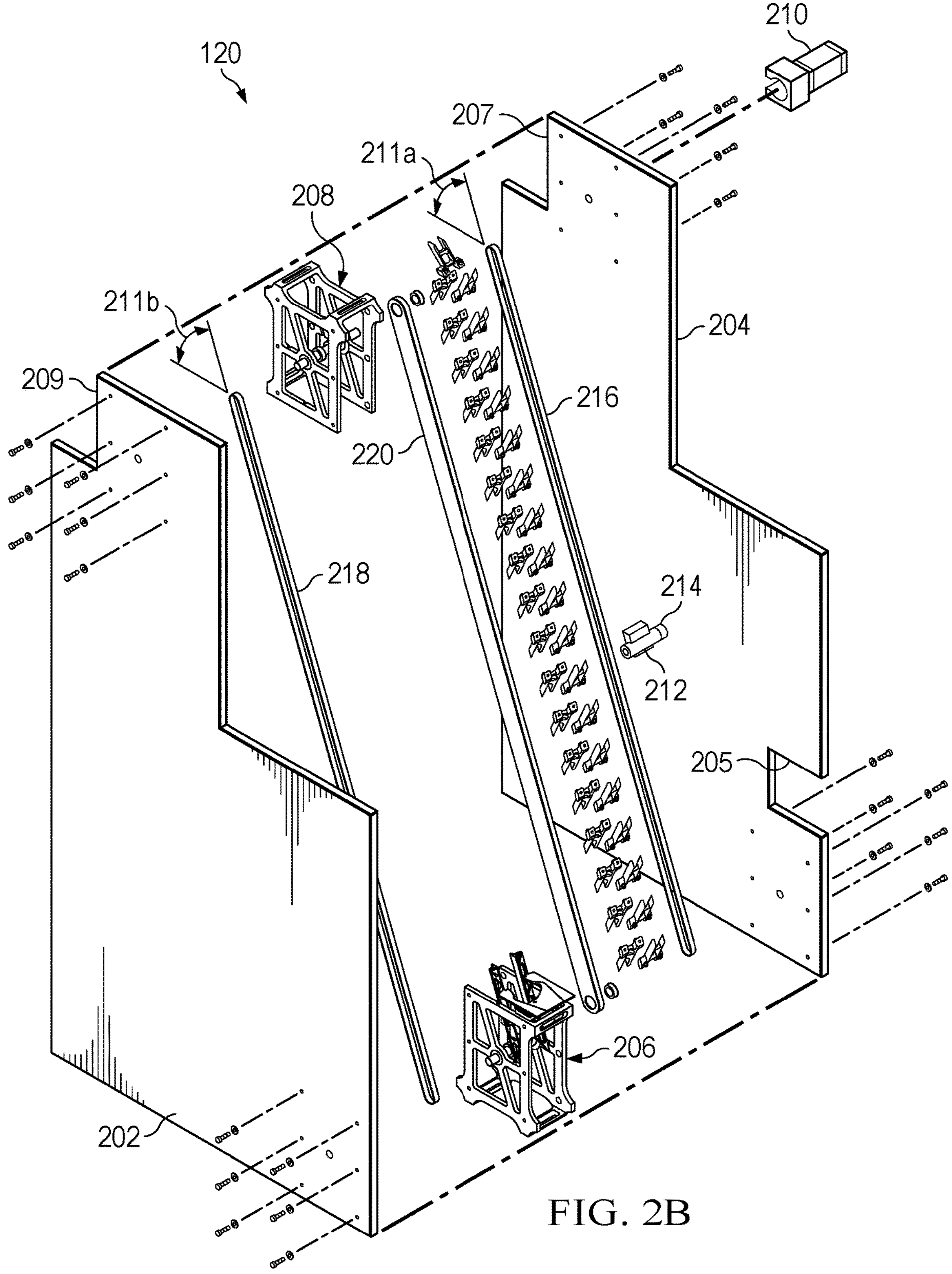
FIG. 2B is an exploded isometric view of a preferred conveyor assembly.
Figure 2C:
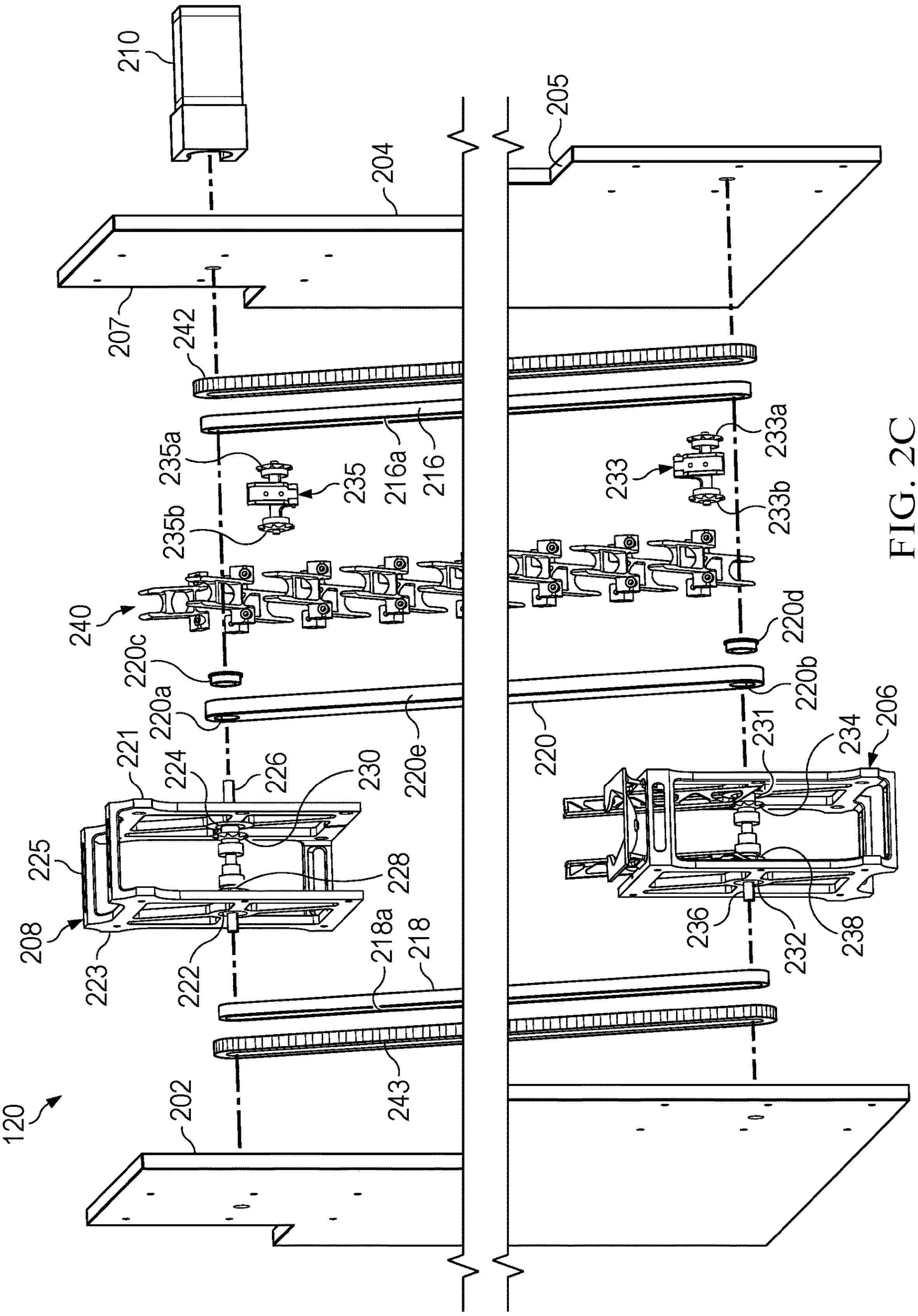
FIG. 2C is an exploded isometric view of a preferred conveyor assembly.

Referring also then to FIGS. 2B and 2C, panel 204 and panel 202 support conveyor base bottom 206 and conveyor base top 208.

Conveyor base top 208 is a generally rectangular cage comprising frame wall 221 and frame wall 223 set off by spacers 225. Frame wall 221 centrally supports bearing 224. Frame wall 223 centrally supports bearing 222. Bearing 222 and 224 rotatively support drive shaft 226. Drive shaft 226 is operatively connected to motor 210, as will be further described. Motor 210 is in turn supported by panel 204 with appropriate fasteners.

Drive shaft 226 includes drives sprocket 228 and drive sprocket 230, which are rigidly attached to the shaft between frame walls 221 and 223.

Figure 2D:
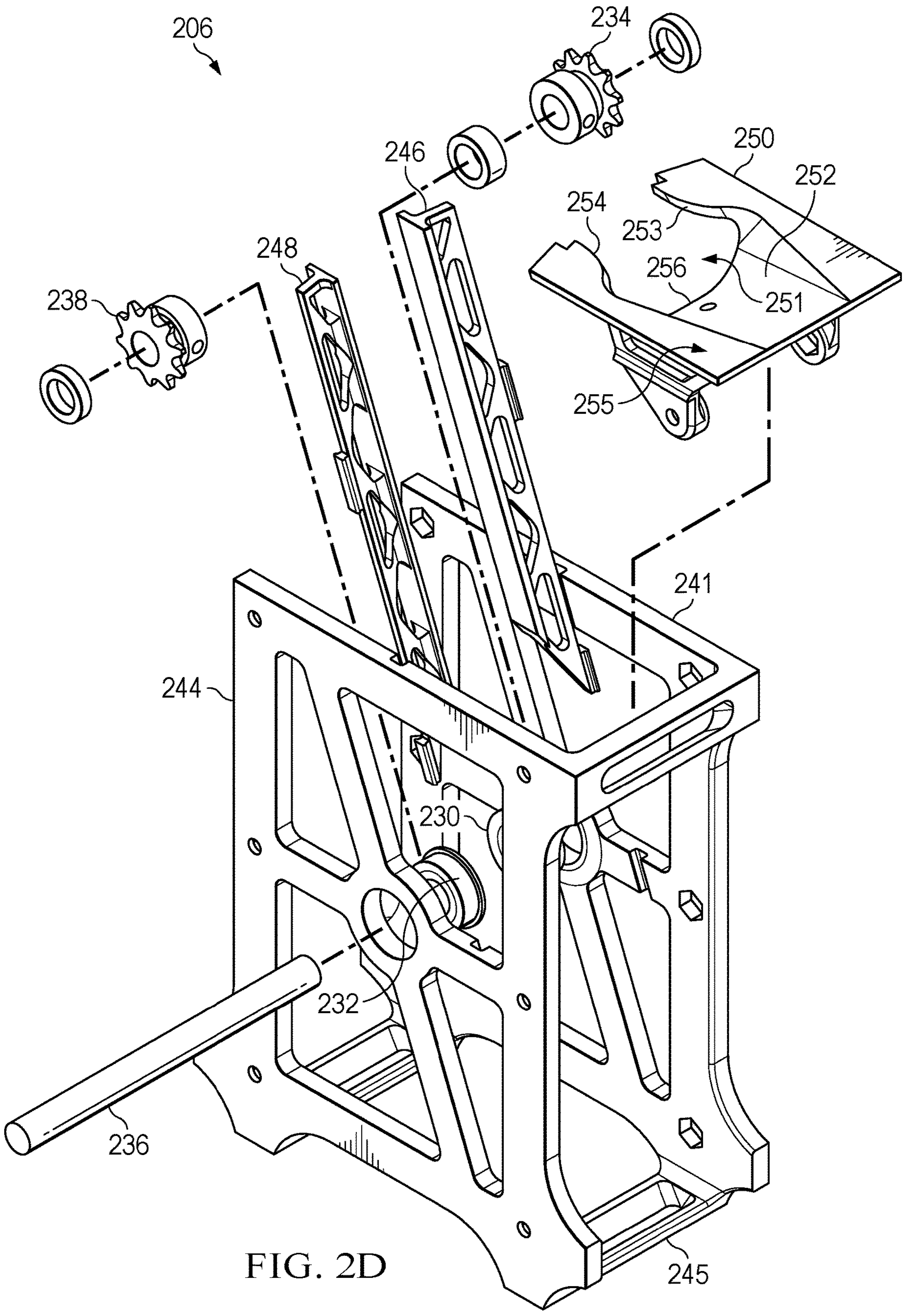
FIG. 2D is a detail isometric view of a preferred conveyor base.

Referring also then to FIG. 2D, conveyor base bottom 206 is also a generally rectangular cage formed by frame wall 241 and frame wall 244 separated by spacers 245. Frame wall 241 centrally supports bearing 231. Frame wall 244 centrally supports bearing 232. Bearing 231 and bearing 232 rotatively support idler shaft 236. Idler shaft 236 further supports idler sprocket 234 and idler sprocket 238. Both idler sprocket 234 and idler sprocket 238 are fixed to the shaft and rotate as it does.

Frame wall 241 and frame wall 244 further support conveyor ramp 250. Conveyor ramp 250 is formed of horizontal loading platform 255, which includes a centrally spaced loading incline 252. Loading incline 252 is bounded by access ledge 256, which is generally circular and terminates in holding ledge 253 and holding ledge 254. The access ledges and the holding ledge form an open cup 251, which is generally spherical having about a 2-inch diameter for accommodating a single golf ball.

Guide rail 246 is positioned adjacent loading incline 252 and holding ledge 253 and held in place at about a 70° angle to horizontal through a rigid attachment to frame wall 241. Likewise, guide rail 248 is held adjacent holding ledge 254 and the loading incline 252 at about a 70° angle to horizontal by frame wall 244.

Figure 2E:
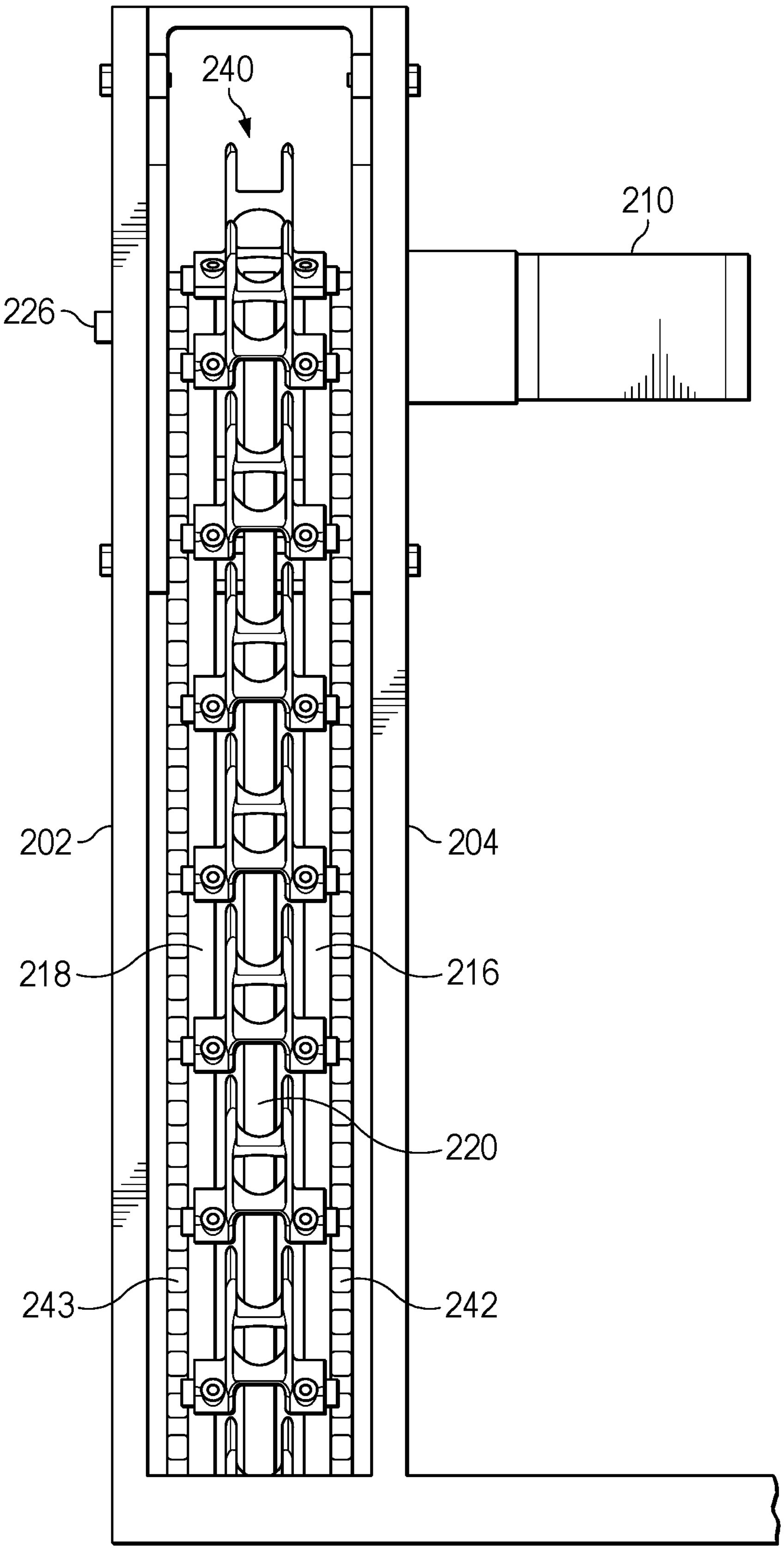
FIG. 2E is a detail partial side view of a preferred hopper conveyor assembly.

Referring again to FIG. 2C, and additionally to FIG. 2E, chain platform 216 is a generally rectangular bar including oblong slot 216*a*. Chain platform 216 encircles drive shaft 226 and idler shaft 236 positioned at opposite ends of oblong slot 216*a* and is held in place by frame wall 221 at lift angle 211*a* of about a 70° angle to horizontal. Likewise, chain platform 218 is a generally rectangular bar, which includes oblong slot 218*a*. Chain platform 218 encircles drive shaft 226 and idler shaft 236 at opposite ends of oblong slot 218*a* and is held in place by frame wall 223, at lift angle 211*b* of about a 70° angle to horizontal.

Both chain platform 216 and chain platform 218 may be manufactured from stainless steel, an aluminum alloy, or rigid plastic materials having a low coefficient and friction such as Teflon or Delrin.

Ball roller 220 is also a generally rectangular bar. Ball roller 220 includes opposing holes 220*a* and 220*b* at its opposite ends which are formed generally perpendicular to its longitudinal axis. Ball roller 220 is centrally positioned on drive shaft 226 and drive shaft 236 through holes 220*a* and 220*b*, respectively. The ball roller is positioned about a 70° angle to horizontal. Preferably, the ball roller is supported on the drive shafts with roller bearings 220*c* and 220*d* to offset downward forces against the ball roller, as will be further described. Ball roller 220 is operatively positioned between chain platform 216 and chain platform 218. Importantly, ball roller 220 includes incline surface 220*e*. Incline surface 220*e* preferably includes a roughened, rubber coating with a high coefficient of friction "μt" of about 0.4. In other embodiments, the incline surface may be a flat, rubberized material adhered to ball roller 220 by a suitable, permanent industrial adhesive. Ball roller 220 further supports chain tensioner assembly 233 and chain tensioner assembly 235 on its underside.

Figure 2F:
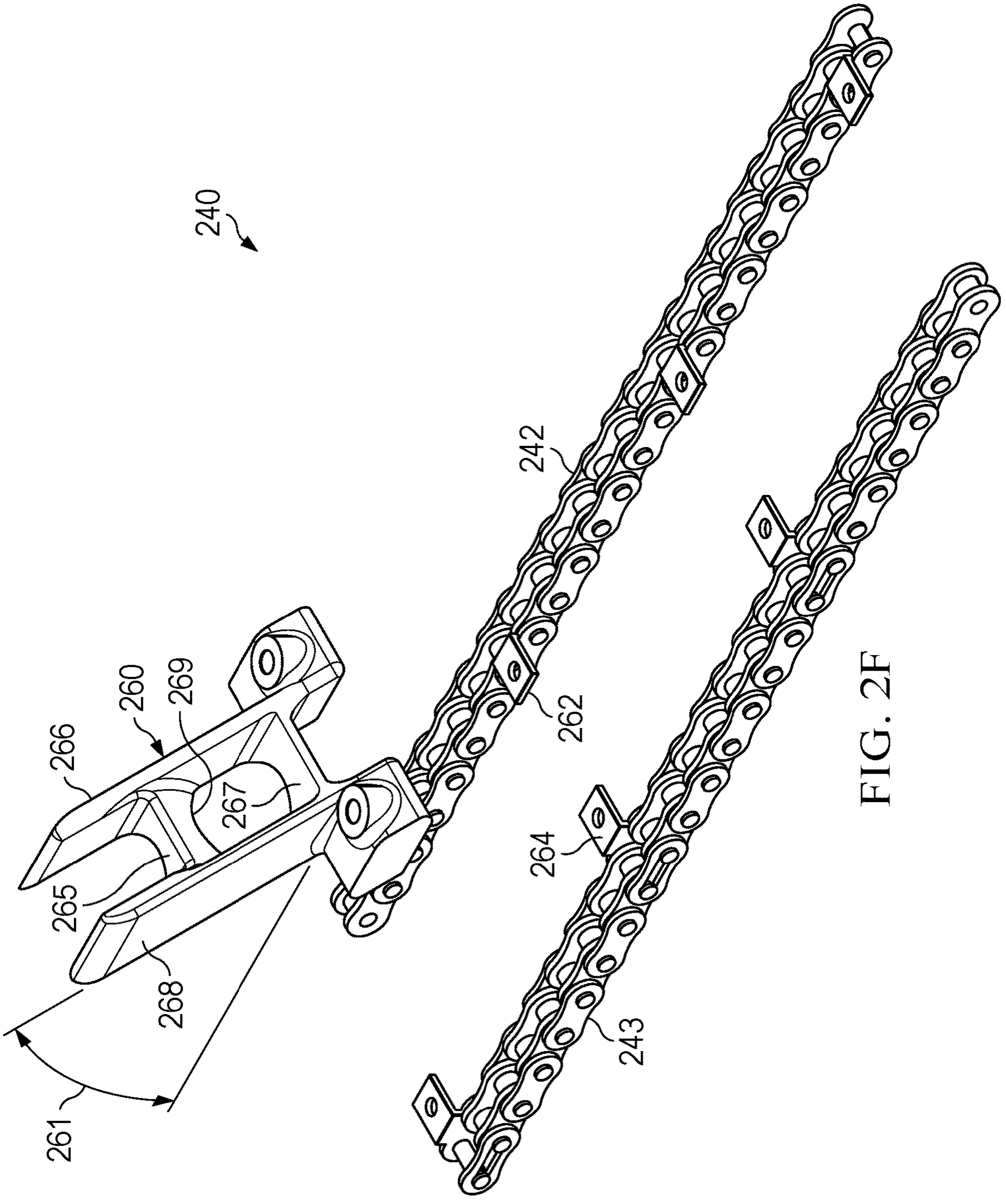
FIG. 2F is an exploded isometric view of a preferred chain assembly.
Figure 2G:
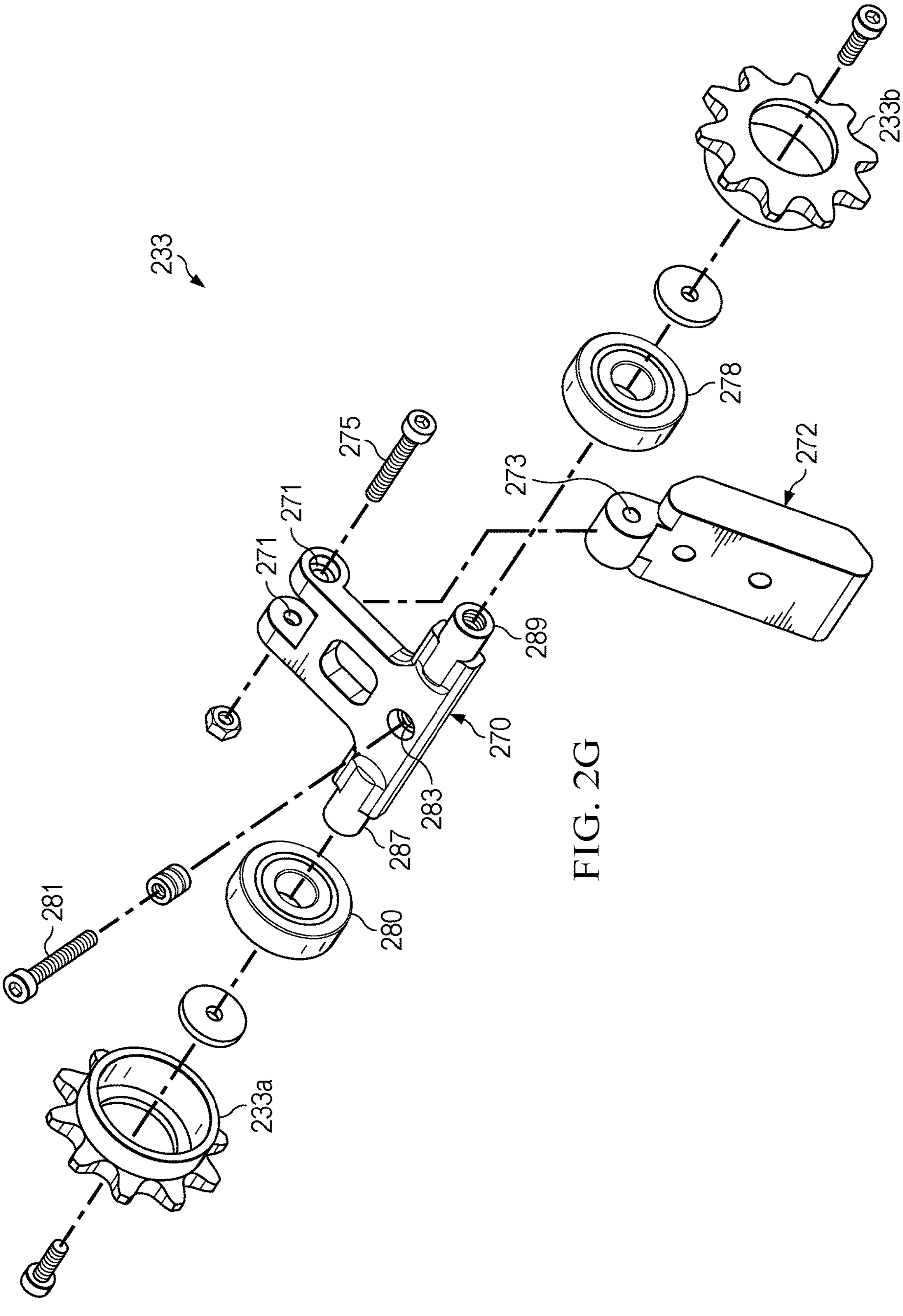
FIG. 2G is an exploded isometric view of a preferred chain tensioner.

Referring also to FIG. 2G, chain tensioner assembly 233 includes tensioning sprocket 233*a* and opposing tensioning sprocket 233*b*. Likewise, chain tensioner assembly 235 includes tensioning sprocket 235*a* and opposing tensioning sprocket 235*b*.

Chain tensioner assembly 233 is further comprised of tensioner mount 272, which is fixed to the underside surface of ball roller 220 by appropriate fasteners. Tensioner mount 272 pivotally supports tensioner arm 270 by screw 275 through holes 273 and 271, respectively. Tensioner arm 270 further includes pivot stanchion 287 and pivot stanchion 289. Pivot stanchion 287 supports bearing 280, which in turn supports tensioning sprocket 233*a*. Likewise, pivot stanchion 289 supports bearing 278, which in turn, rotatively supports tensioning sprocket 233*b*.

Tensioner arm 270 can be angularly adjusted with respect to tensioner mount 272 by rotating screw 281 through threaded hole 283. Tensioning screw 281 imposes on tensioner mount 272, thereby forcing tensioner arm 270 away from tensioner mount 272.

Chain tensioner assembly 235 is attached to the ball roller in the same way and includes similar components that function in a similar manner.

Referring again to FIG. 2C, chain 242 is operatively positioned between chain platform 216 and frame wall 223 and frame wall 244. Chain 242 traverses drive sprocket 230, tensioning sprocket 235*a*, tensioning sprocket 233*a*, and idler sprocket 234. Likewise, chain 243 is operatively positioned between chain platform 218 and frame wall 221 and frame wall 241. Chain 243 traverses drive sprocket 228, tensioning sprocket 235*b*, tensioning sprocket 233*b*, and idler sprocket 238.

Referring also to FIG. 2F, chain assembly 240 includes a set of ball platforms, such as ball platform 260, which is described as an example. In a preferred embodiment, 37 ball platforms are evenly spaced on each chain. At any given time, half of the ball platforms are above and half of the ball platforms are below the ball roller. Ball platform 260 is operatively attached to chain 242 by attachment link 262, and chain 243 by attachment link 264 by appropriate attachment screws (not shown).

Ball platform 260 is further comprised of loading prong 266 and loading prong 268. The loading prongs are generally parallel and rise upward at attack angle 261 of about 45°. Loading prong 266 and loading prong 268 are connected by cross piece 265 and cross piece 267. Loading prong 266, loading prong 268, cross piece 265, and cross piece 267 form semi-hemispherical cradle 269. Semi-hemispherical cradle 269 is formed with a radius of less than 2 inches and is slightly less than the average radius of a golf ball. Ball platform 260 is preferably manufactured from a light aluminum alloy, where the interior surface of semi-hemispherical cradle 269 is polished. In another embodiment, the ball platform may be comprised of a low coefficient of friction material such as Teflon or Delrin. The polished surface and material of the ball platform is not mere design choice but is important because the low-friction coefficient of the material allows a golf ball to easily roll when positioned in the semi-hemispherical cradle, as will be further described.

In use, motor 210 rotates drive shaft 226 in either a clockwise or counterclockwise direction thereby rotating drive sprocket 230 and drive sprocket 228. Drive sprocket 230 advances chain 242 to move adjacent to and guided by chain platform 216 and ball roller 220 around tensioning sprocket 235*a*, tensioning sprocket 233*a*, and idler sprocket 234. Likewise, drive sprocket 228 advances chain 243 adjacent to and guided by chain platform 218 and ball roller 220, around tensioning sprocket 235*b*, tensioning sprocket 233*b*, and idler sprocket 238.

Chain 242 and chain 243 then advance the ball platform to move either upward or downward along incline surface 220*e*. Typically, the ball platforms move in an upward direction, but may be moved in a downward direction to clear jam conditions. Importantly, attack angle 261 of each prong on the ball platform in combination with the upward angle of the ball roller provides two points of contact on each ball (at least one on each prong), thereby forcing each ball to alternate between rolling in two planes, one parallel to one prong, and one parallel to the other prong, while ascending the conveyor assembly. Since the ball rolls in two alternating planes, it is more likely to display its entire surface to the camera while ascending the conveyor assembly. This surprising result greatly speeds the training of the CNN and further greatly increases the accuracy of the sort algorithm, as will be further described. Golf balls contained in hopper 121 move through conveyor entrance 205 and impinge on access ledge 256 of loading platform 255 and move towards loading incline 252. The balls roll down loading incline 252, where they are stopped by holding ledge 253, holding ledge 254, and access ledge 256. As the ball platform moves upward along ball roller 220, loading prongs 266 and 268, encounter the golf ball in the loading platform and move it over cross piece 265 to rest against cross piece 267 in semi-hemispherical cradle 269. The ball platform urges the golf ball against incline surface 220*e* by the pressure of the loading prongs, guided by guide rails 246 and 248 thereby rotating the golf ball as it is moved along ball roller 220 as the chain is moving in an upward direction.

Importantly, as the chain is moved in a reverse direction, the golf ball may be moved out of loading platform 255 by loading prong 266 and 268 using attack angle 261 to force the golf ball upward along loading incline 252. In this way, conveyor assembly may move golf balls either upward or downward along the ball roller without jamming incoming or exiting balls in loading platform 255 or conveyor entrance 205.

Figure 3A:
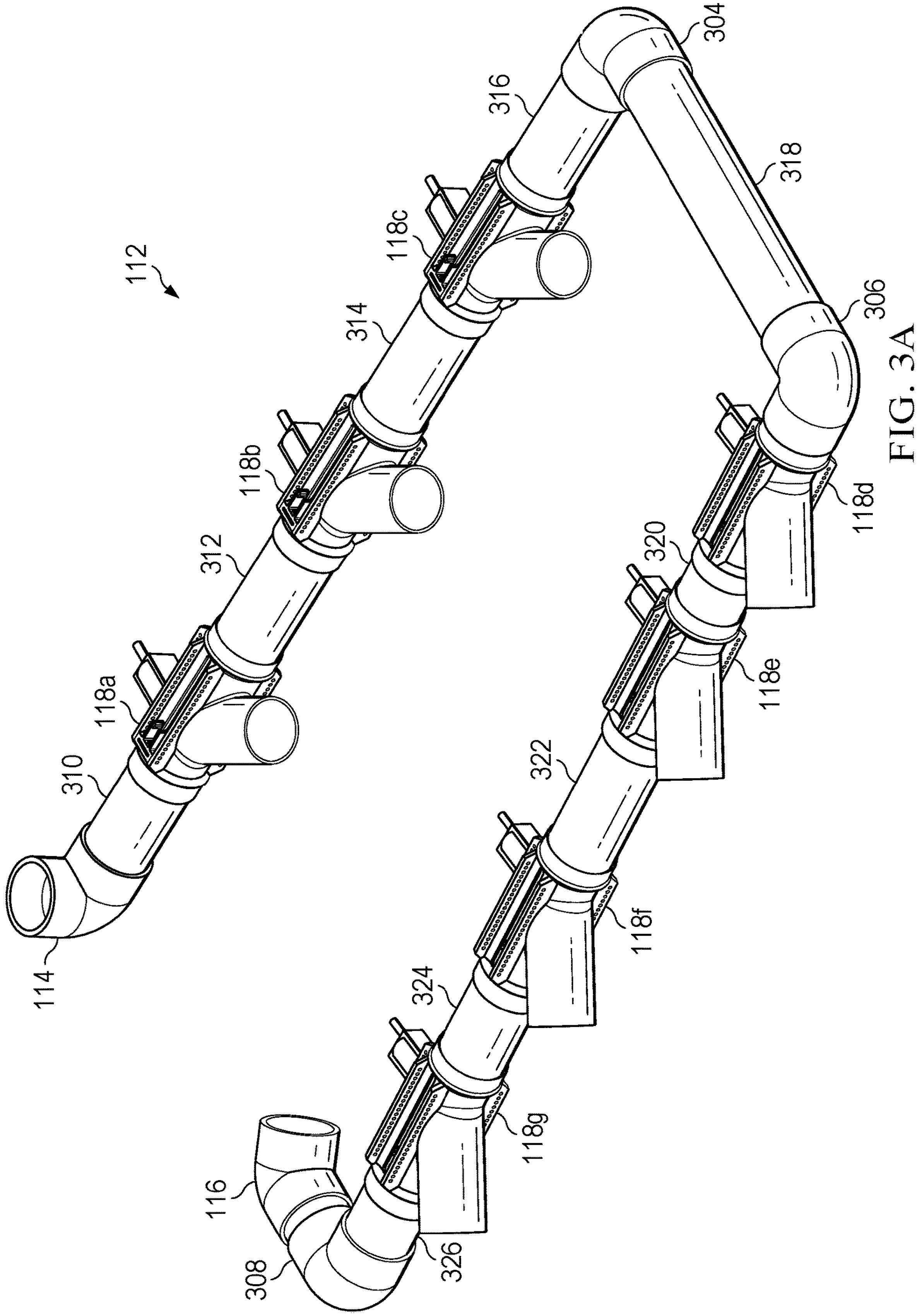
FIG. 3A is an isometric view of a preferred sorter assembly.
Figure 3B:
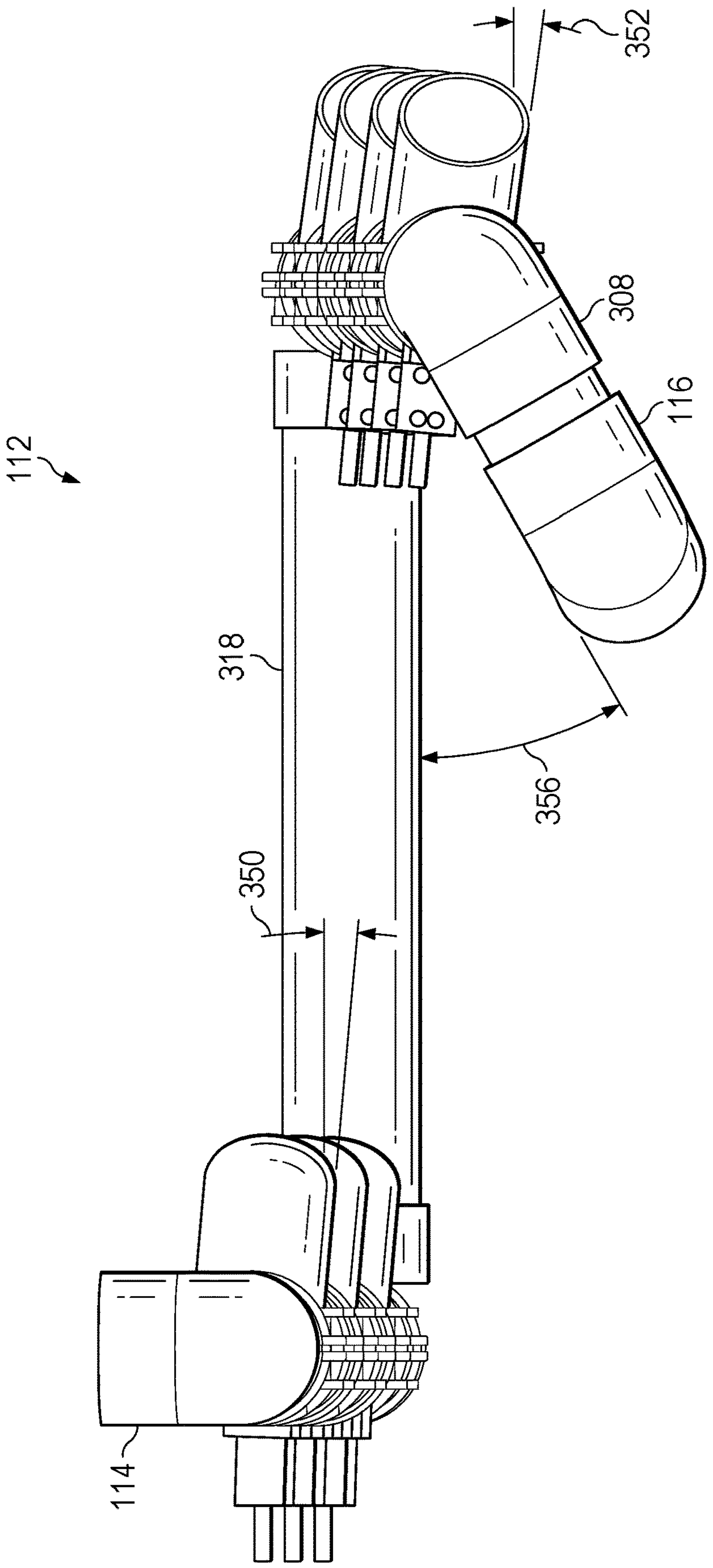
FIG. 3B is a side view of a preferred sorter assembly.
Figure 3C:
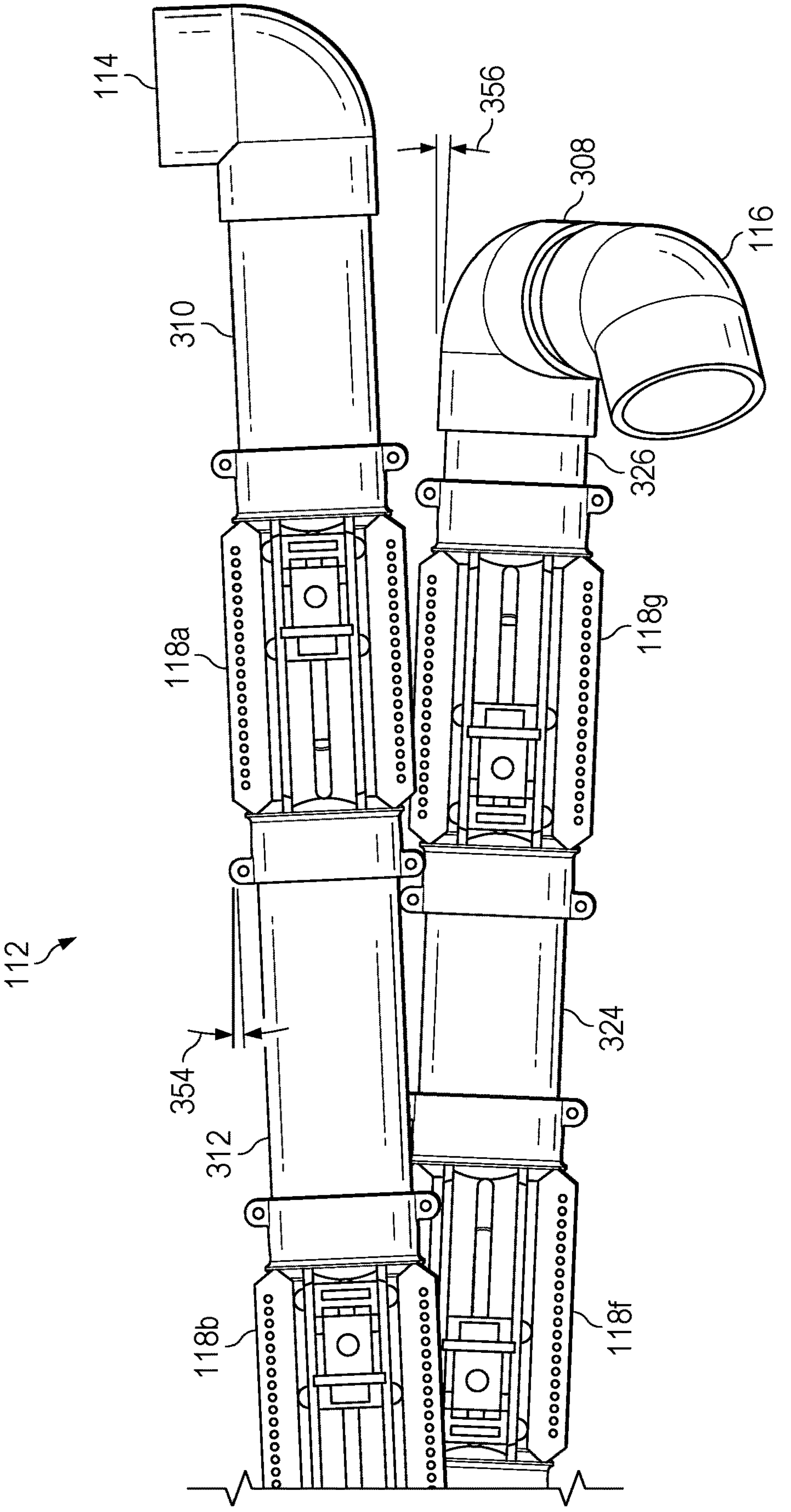
FIG. 3C is a side view of a preferred sorter assembly.

Referring then to FIGS. 3A, 3B and 3C, sorter assembly 112 will be further described.

Sorter assembly 112 includes inlet elbow 115 connected to pipe 310. Pipe 310 is connected to ball gate 118*a*. Ball gate 118*a* is connected to pipe 312. Pipe 312 is connected to ball gate 118*b*. Ball gate 118*b* is connected to pipe 314. Pipe 314 is connected to ball gate 118*c*. Ball gate 118*c* is connected to pipe 316. Pipe 316 is connected to elbow 304. Elbow 304 is connected to pipe 318. Pipe 318 is connected to elbow 306. Elbow 306 is connected to ball gate 118*d*. Ball gate 118*d* is connected to pipe 320. Pipe 320 is connected to ball gate 118*e*. Ball gate 118*e* is connected to pipe 322. Pipe 322 is connected to ball gate 118*f*. Ball gate 118*f* is connected to pipe 324. Pipe 324 is connected to ball gate 118*g*. Ball gate 118*g* is connected to pipe 326. Pipe 326 is connected to elbow 308. Elbow 308 is connected to outlet elbow 116. Of course, other numbers of ball gates may be positioned on the pipes in other embodiments.

Inlet elbow 115, elbow 304, elbow 306, and elbow 308 are all 90° elbows. Outlet elbow 116 is preferably a 45° elbow. The inlet elbow, elbows, an outlet elbow as well as all pipes in the sorter assembly are preferred 80 PVC with a nominal diameter of 2 inches and an average inner diameter of 1.91 inches.

In order to facilitate gravity feed, each of the pipes and ball gate is sloped at a downward angle. For example, pipe 310, pipe 312, pipe 314 and pipe 316 all form down angle 354 of about 2.5° decline from horizontal. Likewise, pipe 318 forms downward angle 350 of about 2.5° from horizontal. In the same way, pipes 320, 322, 324 and 326 form down angle 356 of about 2.5°. However, elbow 308 and outlet elbow 116 form down angle 356 of about 30°. Angle 356 is not mere design choice but is added to prevent jamming at outlet elbow 116. The ball gates make down angle 352 of about 5°.

In a preferred embodiment, the distance from inlet elbow 115 to elbow 304 is about 40 inches. Likewise, in a preferred embodiment, the distance between elbow 306 and elbow 308 is about 40 inches. The preferred distance between elbow 306 and elbow 304 is about 36 inches. Of course, other distances can be used in other embodiments. The sorter assembly is supported by top cover 114 which positions inlet elbow 115 adjacent conveyor base top 208. Outlet elbow 116 is positioned directly above hopper 121.

Figure 4A:
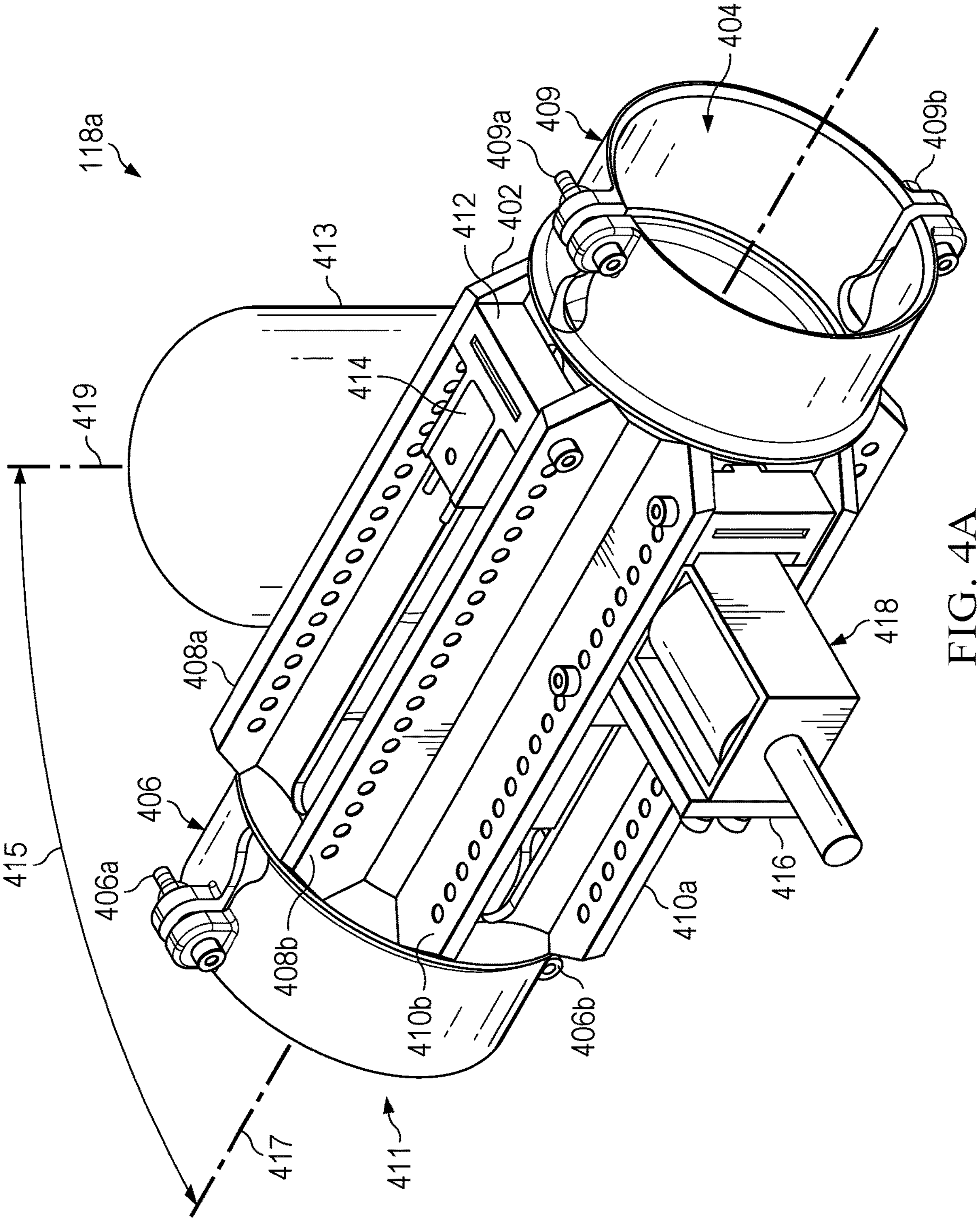
FIG. 4A is an isometric view of a preferred ball gate assembly.
Figure 4B:
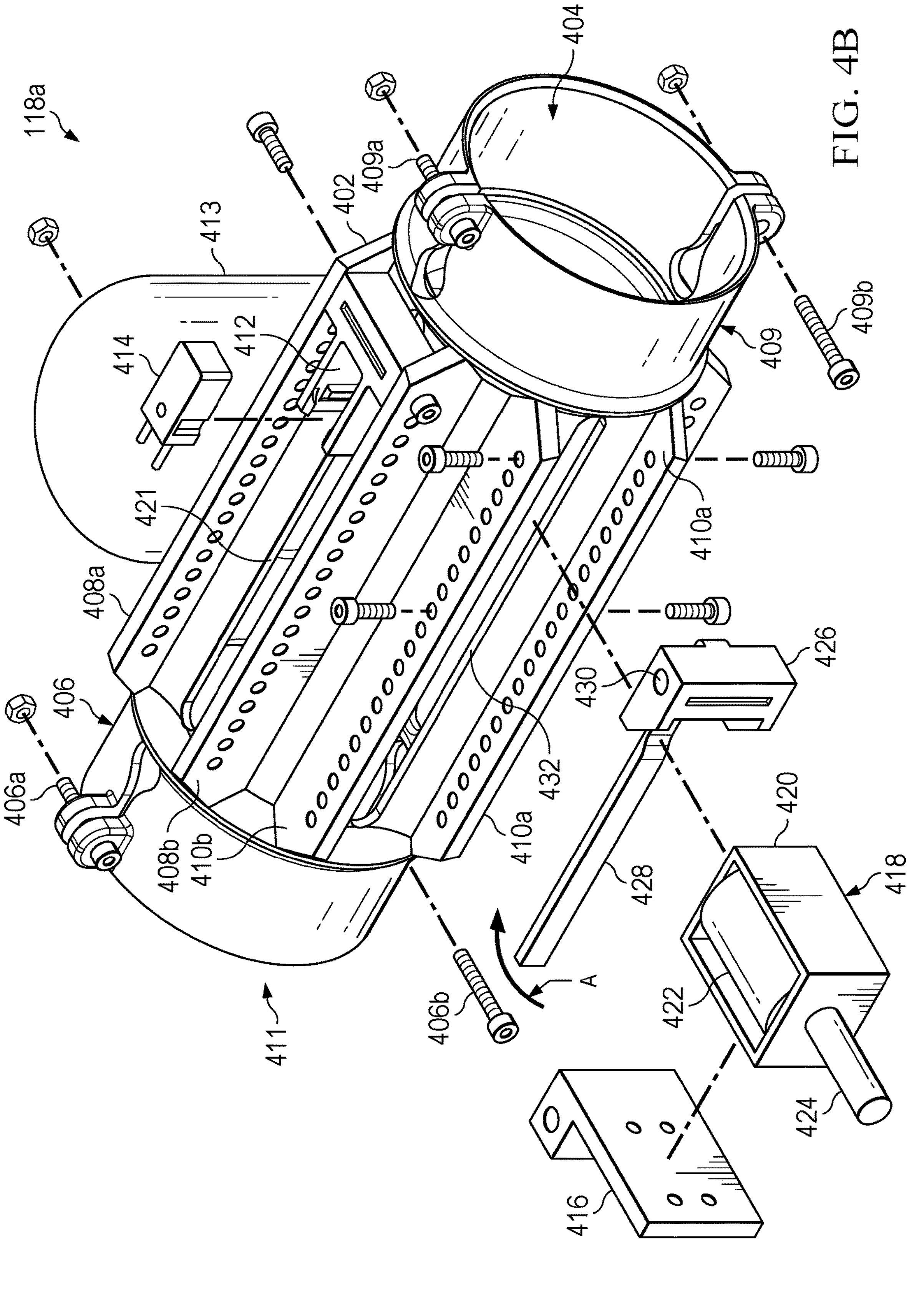
FIG. 4B is an isometric exploded view of a preferred ball gate assembly.

Referring to FIGS. 4A and 4B, ball gate 118*a* will be further described as an example of each of the ball gates of a preferred embodiment.

Ball gate 118*a* includes tubular frame 402. Tubular frame 402 is generally a "y" casting having a single inlet and two outlets. Tubular frame 402 includes inlet 404 ductedly connected to outlet 411, colinear along central axis 417. Tubular frame 402 further includes outlet tube 413. Outlet tube 413 has a central axis 419 which intersects a central axis 417 at angle 415 of about 45°. The inlets and outlets have an internal diameter of about 2 inches to accommodate the diameter of a single golf ball. Inlet clamp 409 is integrally formed with the tubular frame adjacent inlet 404 and forms a collar which may be adjusted through the use of tightening screws 409*a* and 409*b*. The inlet clamp secures ball gate 118*a* to pipe 310 at a preferred down angle of about 5° from the axis of the central axis of the pipe. Likewise, outlet clamp 406 is integrally formed in the tubular frame adjacent outlet 411. Outlet clamp 406 is a collar adjustable through use of screws 406*a* and 406*b*. Screws 406*a* and 406*b* are used to secure the ball gate to pipe 312.

Tubular frame 402 further comprises longitudinal mounting rails 408*a* and 408*b*. Sensor mount 412 is secured to mounting rail 408*a* and 408*b* through the use of appropriate mechanical fasteners such as screws. Frame 402 further includes longitudinal slot 421 between the mounting rails and generally parallel with central axis 417 directly below sensor mount 412. Sensor mount 412 supports infrared sensor 414 which is positioned to view the intersection of axis 419 and axis 417 through the slot.

Tubular frame 402 further includes mounting rails 410*a* and 410*b*. Mounting rails 410*a* and 410*b* rigidly support gate mount 426. Gate mount 426 pivotally supports gate 428. Gate 428 is preferably a pivoted aluminum arm about 3 inches long. Tubular frame 402 further comprises longitudinal slot 432 between the mounting rails and generally parallel with central axis 417. Gate 428 is positioned directly adjacent slot 432 and may pivot in a plane, parallel with central axis 417, to either allow golf balls to pass along central axis 417, or be diverted along axis 419, as will be further described.

Mounting rail 410*a* and 410*b* further supports solenoid mount 416. Solenoid mount 416 supports solenoid 418 and positions it generally perpendicular to axis 417.

Solenoid 418 includes housing 420. Housing 420 supports coil 422. Coil 422 axially supports plunger 424 and positions it so that when activated, coil 422 moves plunger 424 outward to impinge on gate 428, thereby pivoting gate 428, about pivotal connection 430, into slot 432.

In use, golf balls enter sorter assembly 112 from the apex of the conveyor assembly by dropping into inlet elbow 115 with an initial velocity. Each golf ball travels through the sorter assembly at about 4.9 ft/sec. and exit through one of the ball gates or outlet elbow 116. When each golf ball reaches its appropriate ball gate, the control system receives a signal from one or more of the sensors and activates the appropriate solenoid to move a gate inward to divert the ball out one of the outlets and into the appropriate corresponding bin underneath or back into the hopper. The continuous decline of the various pipes and ball gates assures that the throughput of the sorter assembly is consistently about one ball per second.

Figure 5:
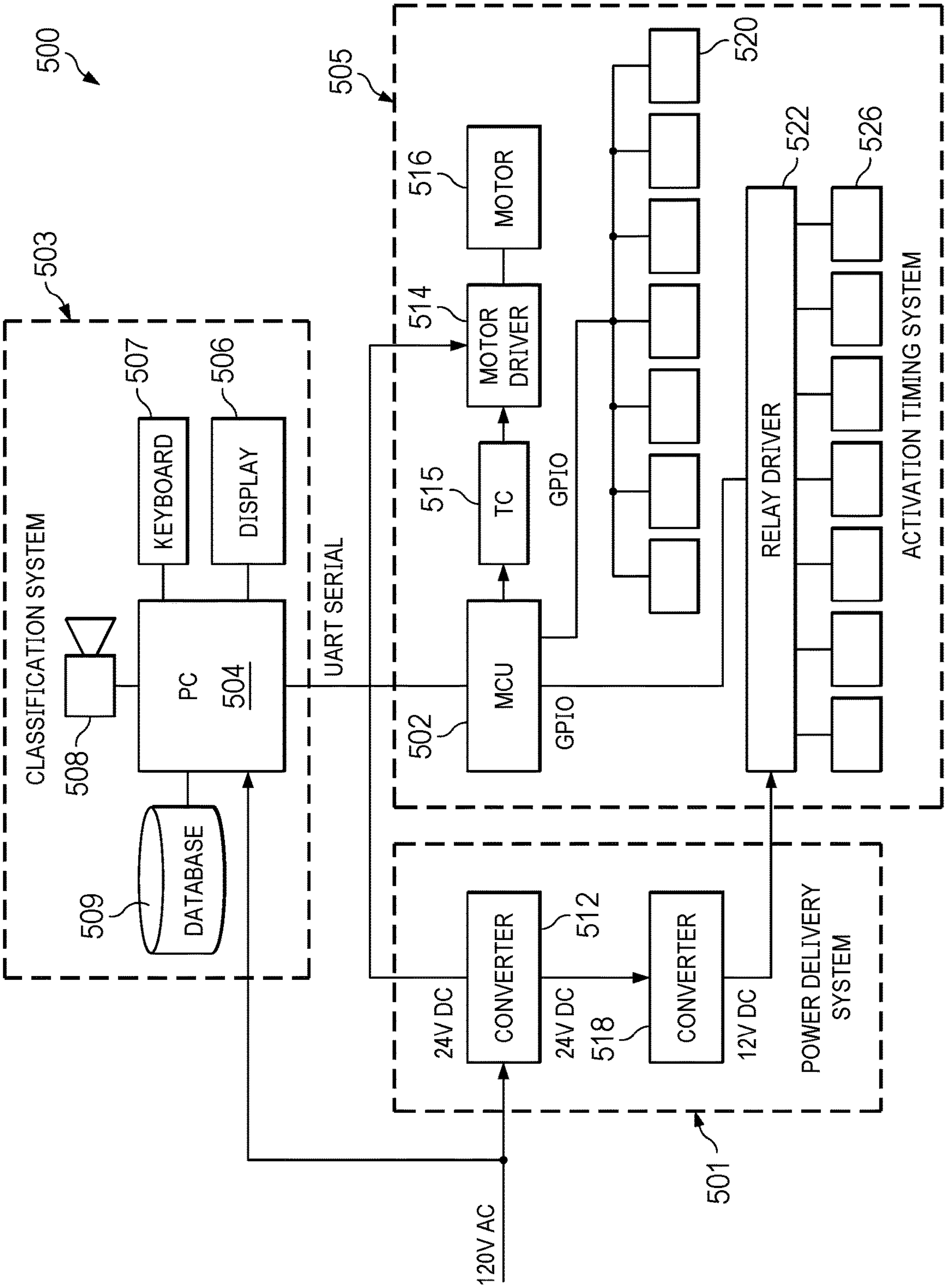
FIG. 5 is an architecture diagram of a preferred controller system.

Referring then to FIG. 5, control system 500 will be further described.

Control system 500 is divided into power delivery system 501, classification system 503 and actuation timing system 505.

Power delivery system 501 further comprises converter 512 operatively connected to converter 518 and motor driver 514. Converter 518 is operatively connected to relay driver 522.

Classification system 503 further comprises PC 504 operatively connected to camera 508, display 506 and keyboard 507. PC 504 is further operatively connected to database 509, which holds the annotated images used to train the CNN model and recognize and locate objects within an image, as will be further described. PC 504 is further operatively connected to MCU 502 through a UART serial connection.

Actuation timing system 505 further comprises MCU 502 operatively connected to transistor circuit 515. Transistor circuit 515 is operatively connected to motor driver 514. Motor driver 514 is operatively connected to motor 516. MCU 502 is further connected to relay driver 522 preferably through its GPIO. Relay driver 522 is connected to a set of solenoids 526. MCU 502 is further operatively connected to a set of sensors 520, also preferably through its GPIO connection.

In a preferred embodiment, converter 512 is part number B08GFQZFC1, by DROK, available at Amazon. Converter 518 is preferably part number 8541759412, available from Amazon. PC 504 is preferably a Precision 7680 Workstation available from Dell, Inc. of Round Rock, Texas. PC 504 includes the 56 core Intel Xeon processor with GPU capacity. Display 506 and keyboard 507 are also connected to PC 504 for IO functionality.

MCU 502 is preferably a Raspberry Pi 4B with 4G memory, part number 959924 available from Micro Electronics, Inc. of Hilliard, Ohio. Relay driver 522 is preferably 12 V, 8-channel opto-isolator relay, part number BOOLW2GA5Y, available from Shenzhem HiLetgo Technology Co., Ltd. of Guangdong, China. Preferably, solenoids 526 feature 12 V, 10 mm stroke solenoids, part number JF-0837B, available from Amazon. Sensors 520 are preferably part number 1528-2526-ND infrared thru-beam sensors available from DigiKey Corporation of Thief River Falls, Minnesota. Motor driver 514 is part number DM542T available from Stepperonline Inc. of New York, NY. Likewise, motor 516, preferably a stepper motor, is preferably part number 23HS45-4204S available from Stepperonline. Camera 508 is preferably a single ArduCam OV9281 available from ArduCam, PC of Nanjing, China. Camera 508 is capable of 120 frames per second and a capture rate at 1208P and is powered by USB connection.

In use, the power delivery system takes 120 V AC supply as its input, which is converted by converter 512 to 24 V DC. The 24 V DC supplies motor driver 514, which in turn controls motor 516 that drives the conveyor. The 24 V line is stepped down to 12 V by converter 518 to supply relay driver 522 that drives the solenoids responsible for redirecting balls to the correct bin. In addition, PC 504 supplies MCU 502 with 5 V at 3 amps via a USB port.

Relay driver 522 is used to provide isolation between the solenoids, which operate at 12 V and 1.5 amps, and MCU 502 whose general-purpose input output (GPIO) ports can only source 3.3 V at 16 mA. MCU 502 sends a control signal to relay driver 522 depending on which ball has been identified. This control signal switches a relay to short a 12 V supply to one terminal of each solenoid. The other terminal of the solenoid is always connected to ground, so the solenoid will actuate immediately when activated. The isolation created by using the relay driver is sufficient to protect the MCU from flyback current and does not create noticeable delay.

Due to the size and the size of the motor and voltage required, motor driver 514 requires a higher voltage that can be supplied directly by MCU 502. A suitable transistor circuit 515 is supplied to provide the necessary current, as is known in the art.

Classification system 503 and actuation timing system 505 are responsible for machine learning to identify the ballas and send them out the appropriate gate. In the classification process, images are captured by camera 508. The images are then processed through a convolution neural network (CNN) and classified as one of eight categories, one category for unrecognized, dirty, or damaged balls, and seven categories for different ball types. Other numbers and types of categories may be used in other embodiments. Preferably, the convolution neural network is the YOLOv4-tiny available from OpenVINO. The golf balls are distinguished by type such as Titleist, Callaway, TaylorMade, Bridgestone, MaxFli, Top Flite and Srixon and their models such as Chrome Soft, TP5, Tour B X, Tour, XL, Pro V1, or Z-Star. A classification output is sent as a signal from PC 504 to MCU 502 using the UART serial communication. Display 506 then shows which ball was most recently classified, the number of balls in each bin, the total number of classified balls during its lifetime, and any error condition. MCU 502 includes program instructions that send signals to the solenoids through relay driver 522 to prevent damage to the device. The programming of MCU 502 includes a dynamic queue that relies on object-oriented programming in order to track the location of each ball through the system without use of timing, but rather using an interrupt sequence provided by the infrared break beam sensors which detect the passage of balls through each gate subassembly.

Figure 6A:
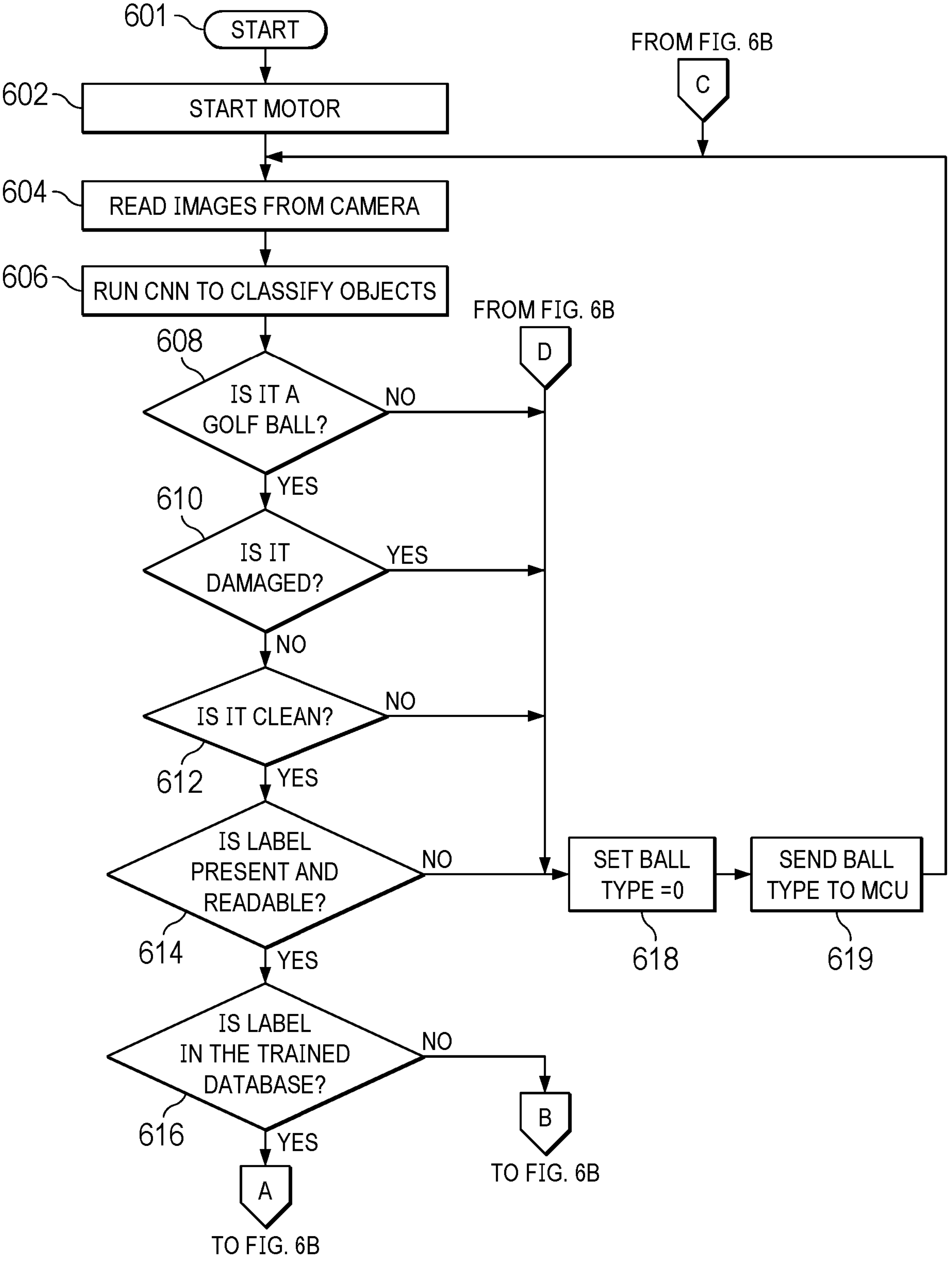
FIGS. 6A and 6B is a flow chart of a preferred sort algorithm.
Figure 6B:
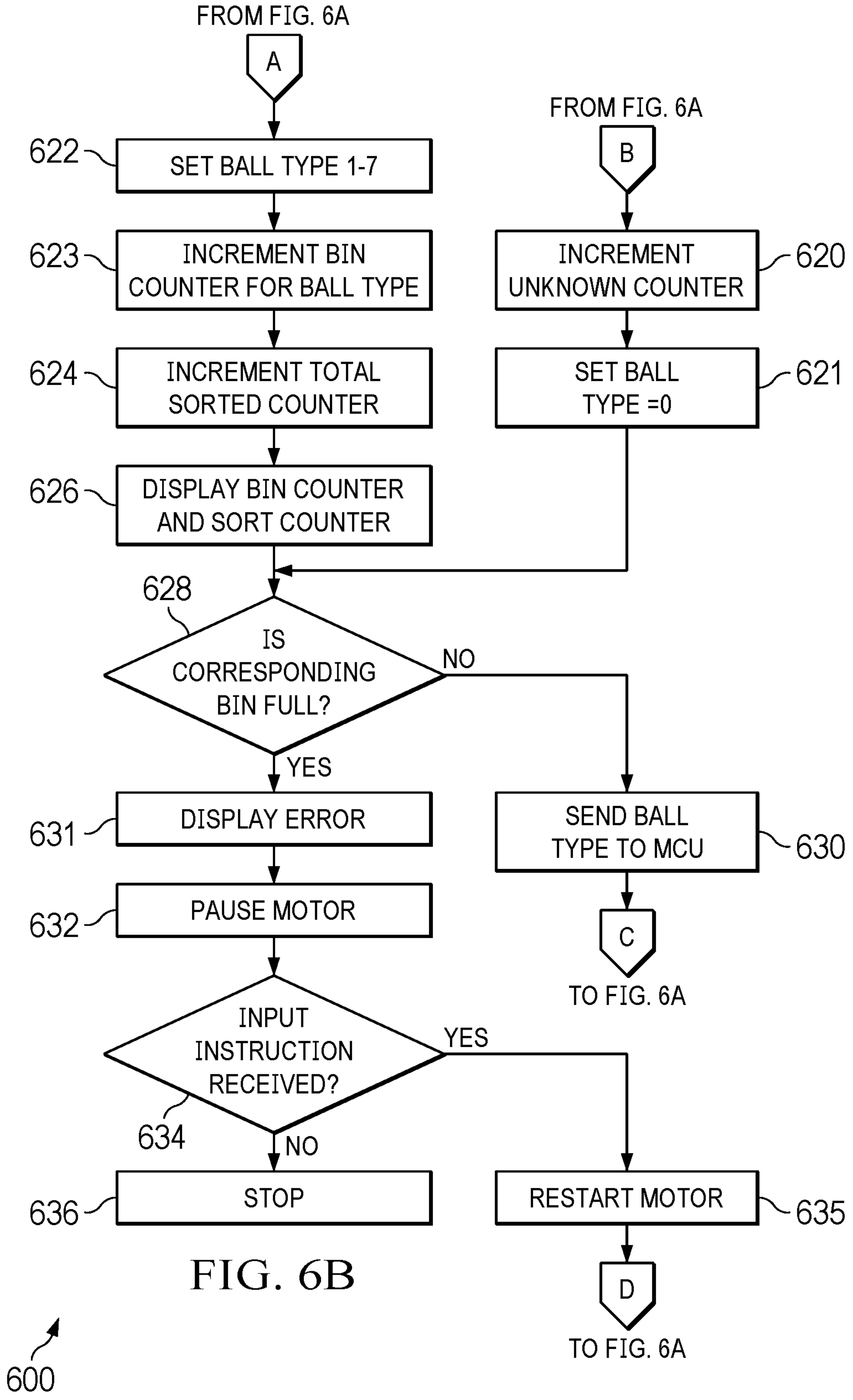

Referring then to FIGS. 6A and 6B, sort algorithm 600 will be further described. In a preferred embodiment, sort algorithm 600 is installed in memory of PC 504 and operates to activate the system, provide I/O to the user, and classify the balls as they move through the sorter.

At step 601, the method begins.

At step 602, PC 504 sends a signal to MCU 502 to activate motor 210.

At step 604, PC 504 reads images from camera 508.

At step 606, PC 504 runs the CNN to classify objects from the images. The output of the CNN when classifying images is a list of bounding boxes for detected objects in the image, along with class labels and confidence scores for each detected object. Each bounding box is represented by a vector of four numbers, including the XY coordinates of the bounding box, as well as its width and height. The class label is an integer that corresponds to the specific class of the detected object. The confidence score is a number between 0 and 1 and indicates the CNN confidence that the detected object belongs to the specified class. In this embodiment, the CNN employs 10 class labels, including "golf ball", "damaged", "dirty", and seven label types "0-7". The label "0" corresponds to "damaged", "dirty" and "unclassified". The labels "golf ball" and "1-7" correspond to types of golf ballas differentiated by images of their labels. Further, in this preferred embodiment, in order to be classified, the model confidence must meet or exceed 90%.

At step 608, PC determines whether or not the class label "golf ball" is present. If so, the method moves to step 610. If not, the method moves to step 618.

At step 610, the PC determines whether or not the class label "damaged" is present. If so, the method moves to step 618. If not, the method moves to step 612.

At step 612, the PC determines whether or not the class label "clean" is present. If so, the method moves to step 614. If not, the method moves to step 618.

At step 614, the PC determines whether or not the class label "label" is present. If so, the method moves to step 616. If not, the method moves to step 618.

At step 616, the PC determines whether or not the label is present in the trained database. If so, the method moves to step 622. If not, the method moves to step 620.

At step 620, the PC increments a counter for unknown objects and moves to step 621. At step 621, the PC sets the ball type variable equal to "0" and moves to step 628.

At step 622, the PC sets the ball type variable to an integer between "1" and "7", which corresponds to the label present in the class label from the CNN. In a preferred embodiment, a table is consulted, which lists the ball types present along with the corresponding integer for the ball type variable.

At step 623, the PC increments a bin counter for the ball type specified. The bin counter is used to trigger an error display when a bin is full.

At step 624, the PC increments a sort counter for the total number of balls sorted. The sort counter is used to predict when maintenance is required for the mechanical components of the system.

At step 626, the PC displays the bin counter and the sort counter.

At step 628, the PC determines whether or not the bin corresponding to the ball type is full. In a preferred embodiment, the corresponding bin is determined to be full if the bin counter for the ball type is equal to or greater than 300. If so, the method moves to step 631. If not, the method moves to step 630.

At step 630, the PC sends the ball type variable to the MCU through the UART serial channel. The method then returns to step 604.

At step 631, the PC displays an error message.

At step 632, the PC sends a message to the MCU to pause the motor.

At step 634, the PC waits a certain predetermined period of time (usually about 30 seconds) for input instruction to be received from the keyboard. If such an instruction is received, the method moves to step 635. If no instruction is received, the method moves to step 636.

At step 635, the PC sends a message to the MCU to restart the motor. The method then returns to step 618.

At step 618, the PC sets the ball type variable to "0".

At step 619, the PC sends the ball type variable to the MCU and returns to step 604.

At step 636, the method concludes.

Figure 6C:
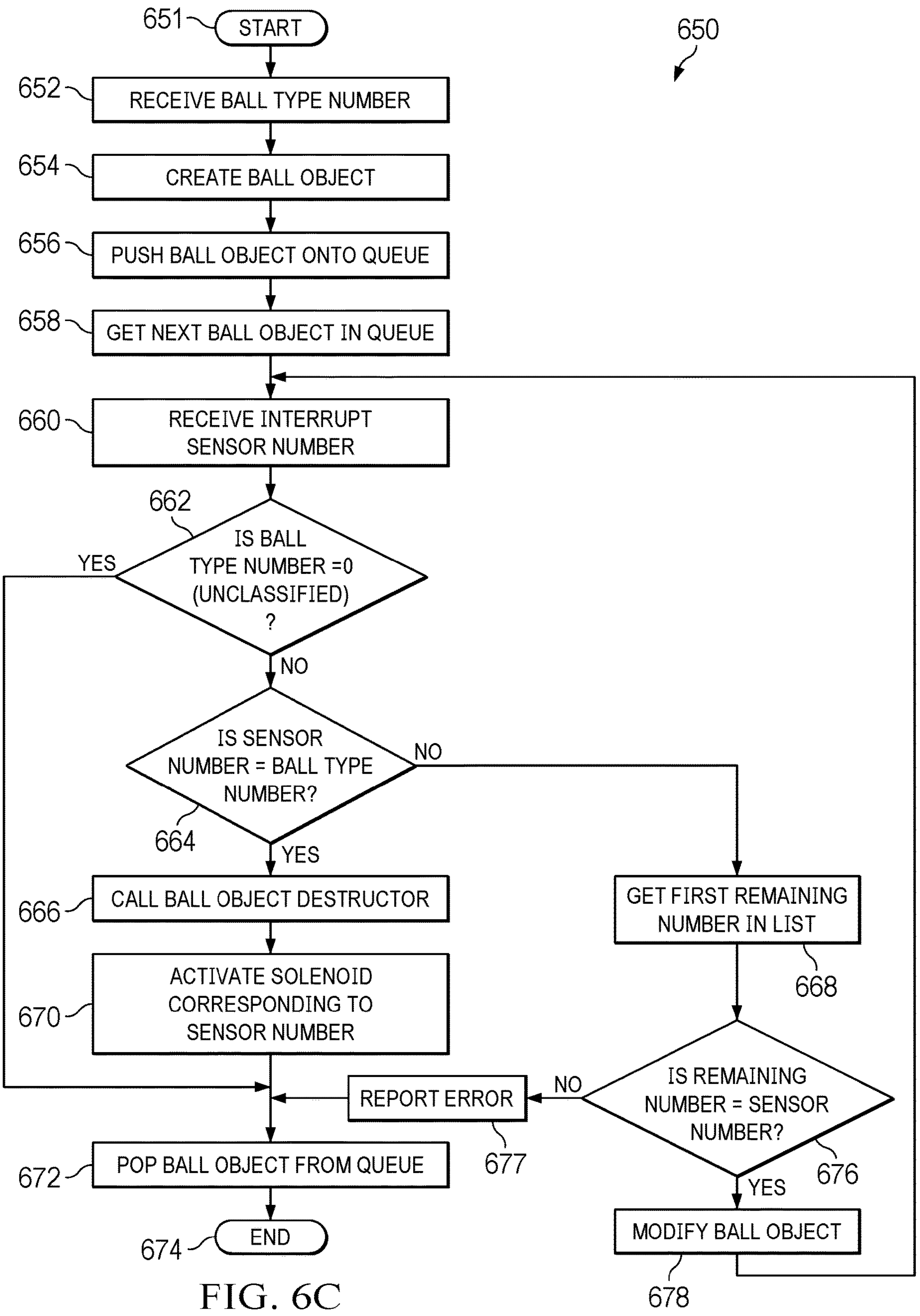
FIG. 6C is a flow chart of a preferred gate control algorithm.

Referring then to FIG. 6C, gate control algorithm 650 will be further described. In a preferred embodiment, gate control algorithm 650 is present in memory of MCU 502 and includes methods that are triggered by receipt of a ball type variable and interrupt signals from the sensors.

At step 651, the method begins.

At step 652, MCU 502 receives a ball type variable from PC 504 through the UART serial channel. In a preferred embodiment, the ball type number is an integer ranging from "0" to "7".

At step 654, the MCU creates a ball object. In a preferred embodiment, gate control algorithm 650 is written using an object-oriented approach, which runs with any number of ball objects, as will be further described. The ball object in a preferred embodiment includes two properties, namely, the gate at which the ball needs to be dispensed (which corresponds to the ball type number) and a list of gates that the ball passes on the way. In a preferred embodiment, these properties are named "gate" and "remaining", but of course other names may be used. The MCU preferably consults a table in memory, which includes the ball type number and then a list of gates that ball type must pass. For example, if the ball type number is "5", then the corresponding list of gates would be "1, 2, 3, 4". As another example, if the ball type number is "0", the corresponding list of gates would be "1, 2, 3, 4, 5, 6, 7".

At step 656, MCU 502 pushes the ball object onto a first-in-first-out (FIFO) queue of ball objects.

At step 658, the MCU pops the next ball object from the queue for processing.

At step 660, the MCU receives an interrupt from one of the sensors, which includes the sensor number. In this embodiment, the sensor number will be an integer between "1" and "7".

At step 662, the MCU determines whether or not the ball type number is "0", corresponding to a ball which is not classified or is damaged or dirty. If so, the method moves to step 672. If not, the method moves to step 664.

At step 664, the MCU determines whether or not the sensor number is equal to the ball type number. If so, the method moves to step 666. If not, the method moves to step 668.

At step 666, the MCU calls a ball object destructor method.

At step 670, the ball object destructor method activates the solenoid corresponding to the sensor number.

At step 672, the MCU removes the current ball object from the queue and moves to step 674.

At step 668, the MCU retrieves the first remaining number from the remaining number list. In the example above, from the remaining number list "1, 2, 3, 4" the first remaining number is "1".

At step 676, the MCU determines if the first remaining number is equal to the sensor number. If so, then the method moves to step 678. If not, the method moves to step 672.

At step 677, an error condition is reported to PC 504 indicating a non-sequential gate activation. The MCU then moves to step 672.

At step 678, the ball object is modified by deleting the first remaining number in the list. In the example, the first remaining number in the list, that is, the number "1", would be deleted from the remaining number list, leaving the remaining number list to be "2, 3, 4". The method then returns to step 660 to wait for another interrupt containing another sensor number.

At step 674, the method concludes.

In a preferred embodiment, MCU 502 runs at least two parallel threads for ball objects during operation of the sort algorithm. This allows the sorter assembly to process at least two ballas at a time.

In use, sort algorithm 600 and gate control algorithm 650 cooperate to achieve a coordinated activation of dispensing the golf balls through the appropriate gates without use or monitoring the time taken for a golf ball to go from one gate to another or using a timing algorithm. Instead, the object-oriented approach creates a queue of ball objects which each has properties of the appropriate exit gate and a list of gates that are passed, before the ball exits the sorter assembly.

Whenever a ball crosses an infrared sensor associated with a gate, an interrupt is triggered which iterates through the ball objects in the queue. If a ball is unclassified nothing should happen, and the method called by the interrupt concludes. If the gate sensor is equal to the gate of the ball object currently being processed, the ball object is removed from the queue and the interrupt handler exits. Immediately after, the destructor method of the ball object actuates the solenoid associated with the gate corresponding to the sensor just triggered. If the ball process is classified, but not supposed to exit the gate whose sensor was just triggered, then the processor analyzes the "remaining" property of the ball being processed to track the position of the ball.

In this method, each ball is tracked through the series of gates proceeding its correct gate in order to be dispensed to the proper bin. If the very first element of the "remaining" property of the ball being processed is not equal to the gate sensor number that triggered the interrupt, then the processor should move to the next ball object in the queue. However, if the converse is true, then the first element of the "remaining" property list is removed for the ball object being analyzed. In one preferred embodiment, a real time graphic of the location of each ball may be displayed, priority by the remaining property as it is decremented for each ball object.

In practice, two cores of the MCU are each capable of processing a single thread corresponding to one ball and one ball object allowing two balls to pass through the sorter assembly at any one time. Of course, processing two balls at a time greatly increases the sorting capacity of the device and is a great improvement over the prior art.

Figure 6D:
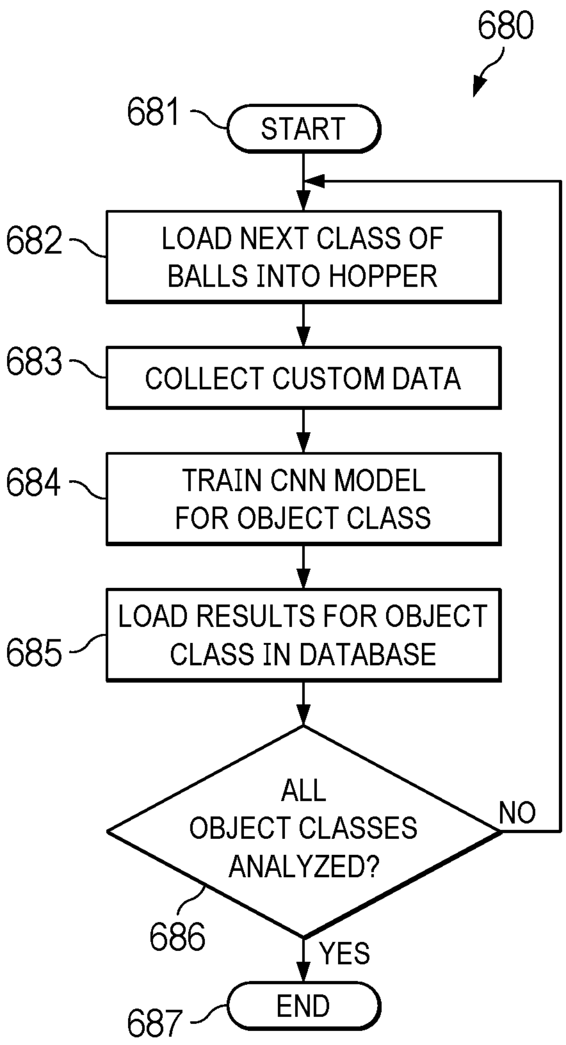
FIG. 6D is a flow chart of a preferred method of gathering training data.

Referring then to FIG. 6D, a preferred data gathering method 680 will be further described.

In a preferred embodiment, method 680 employs a ball sorter as previously described to train a neural network on multiple classes of objects. This method capitalizes on the speed through which the hopper conveyor assembly can process golf balls to train the neural network in a surprisingly low amount of time.

At step 681, the method begins.

At step 682, the hopper is loaded with a single class of golf balls. For example, all of the golf balls loaded into the hopper will have a single label. Likewise, in each iteration of method 680 the hopper is loaded with only a single class of ball objects which, in a preferred embodiment can be "golf ball", "damaged", "dirty" and "labeled" with seven different ball labels. Of course, other embodiments, different numbers of labels or objects can be employed.

At step 683, custom data is collected, as will be further described.

At step 684, the CNN model is trained for a single object class at a time, corresponding to the class of balls loaded into the hopper.

At step 685, the results are loaded as a file for the object class in the database.

At step 686, the method determines whether or not all object classes have been analyzed. If not, the method returns to step 682. If so, the method moves to step 687. At step 687, the method concludes.

Figure 6E:
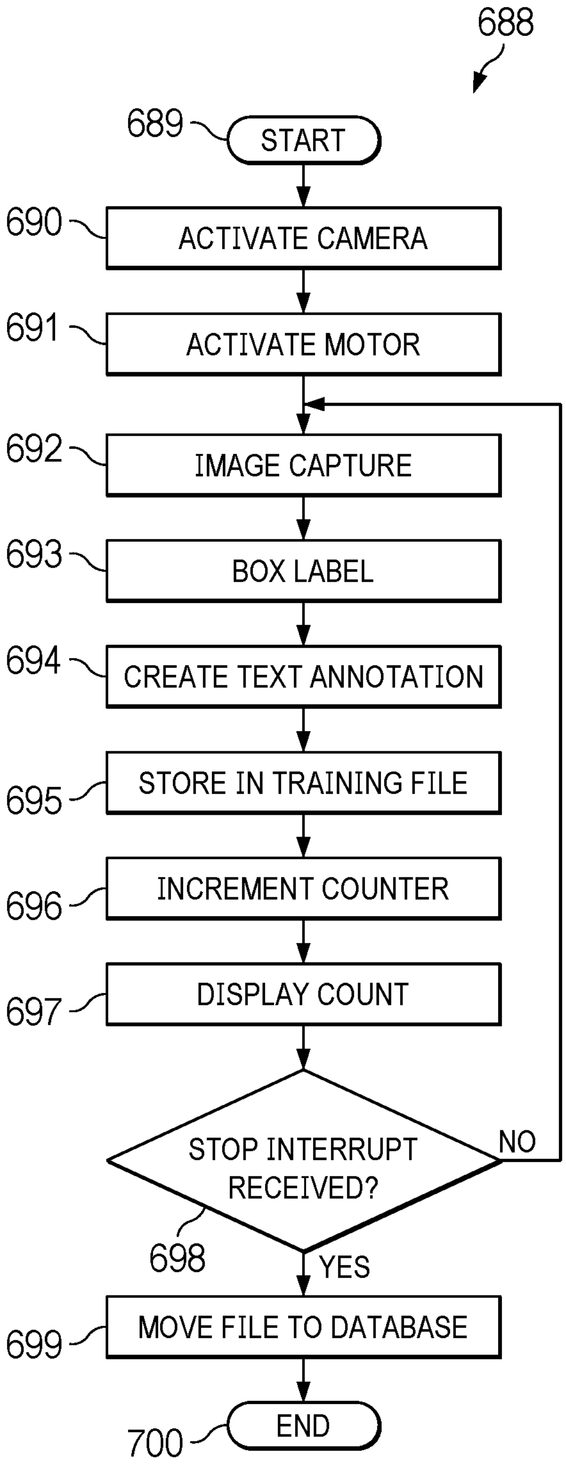
FIG. 6E is a flow chart of a preferred custom data gathering algorithm.

Referring then to FIG. 6E, custom data gathering algorithm 688 will be further described.

In a preferred embodiment, custom data gathering algorithm 688 is present in memory of PC 504 and is used to gather data to train the CNN.

At step 689, the method begins.

At step 690, PC 504 activates camera 508.

At step 691, PC 504 sends a signal to MCU 502 to activate motor 516.

At step 692, PC 504 collects image data from the camera.

In step 684, one embodiment uses pre-trained YOLOv4-tiny weights which have been trained up to 29 convolutional layers in order to capitalize on transfer learning. Further, in this embodiment, training was stopped when the average training loss was less than 0.05 or at least constantly below 0.3.

At step 692, PC 504 captures an image of a golf ball traveling up the conveyor, using camera 508.

At step 693, the image is labeled the appropriate rectangle parameter for the appropriate class. In one embodiment, the classes are "damaged," "dirty" and seven ball types such as "Titleist," "Callaway," "Pro V1" and "Chrome Soft".

At step 694, the PC creates a text annotation for the box label, corresponding to the single class of golf balls.

At step 695, the labeled image is stored in a training file.

At step 696, an image counter is incremented. At step 697, the PC displays the counter number. In a preferred embodiment, the CNN requires about 350 images to be trained on a single object class. Once this number of images is reached, the program may be paused.

At step 698, the PC waits for an interrupt from the keyboard. If it is not received the method returns to step 692. If it is received, the method moves to step 699 and ends.

At step 699, the training file is moved to the database.

At step 700, the method concludes.

The invention claimed is:

1. A sorting apparatus for a set of golf balls comprising:

a frame;

a ball hopper supported by the frame;

a set of sort bins, above the ball hopper, supported by the frame;

a chain driven elevator, having a base positioned adjacent to the ball hopper, and an apex, mounted at an inclined angle to the frame;

a motor, operatively connected to the chain driven elevator;

a set of ball cups, each ball cup of the set of ball cups mounted to the chain driven elevator;

a camera, positioned to view at least one ball cup of the set of ball cups;

a gravity fed sorter divider, positioned adjacent to the apex and above the set of sort bins, and having a set of ball gates above and corresponding to the set of sort bins;

a set of sensors, corresponding to the set of ball gates, wherein each sensor of the set of sensors is operable to send a ball present interrupt;

a control system, having a set of memories, operatively connected to the motor, the camera, the set of sensors, and the set of ball gates;

the set of memories containing a set of program instructions, that when executed cause the control system to:

activate the motor;

receive an image from the camera of a golf ball marking on at least one golf ball of the set of golf balls;

derive an image classification of the image, using a convolutional neural network;

receive the ball present interrupt, corresponding to a sensor of the set of sensors;

track a sequential ball position, using the ball present interrupt; and activate a ball gate, of the set of ball gates, based on the image classification and the sequential ball position;

whereby a golf ball, of the set of golf balls, having the golf ball marking, is tracked, and is directed to a sort bin, of the set of sort bins, corresponding to the image classification;

a conveyor base bottom, held diagonally positioned adjacent a conveyor base top, by the frame;

a drive shaft, having a set of drive sprockets, driven by the motor, rotatively supported by the conveyor base top;

an idler shaft, having a set of idler sprockets, rotatively supported by the conveyor base bottom;

a linear ball roller positioned on the drive shaft and the idler shaft;

a chain assembly, adjacent the linear ball roller, engaged with the set of drive sprockets and the set of idler sprockets; and a set of ball platforms fixed to the chain assembly;

wherein the set of ball platforms engages the set of golf balls and rotates them along the linear ball roller.

2. The sorting apparatus of claim 1, wherein the inclined angle is about 70° from horizontal.

3. The sorting apparatus of claim 1, further comprising:

a first linear chain platform surrounding the idler shaft and the drive shaft, positioned to align the chain assembly; and a second linear chain platform surrounding the idler shaft and the drive shaft, positioned to align to the chain assembly;

wherein the linear ball roller is positioned between the first linear chain platform and the second linear chain platform.

4. The sorting apparatus of claim 3, wherein the chain assembly further comprises:

a first link chain, movably positioned adjacent the first linear chain platform; and a second link chain movably positioned adjacent the second linear chain platform.

5. The sorting apparatus of claim 4, wherein each ball platform, of the set of ball platforms, is connected to the first link chain and the second link chain.

6. The sorting apparatus of claim 5, wherein each ball platform, of the set of ball platforms, further comprises a pair of loading prongs forming a semi-hemispherical cradle.

7. The sorting apparatus of claim 6, wherein the pair of loading progs each make about a 45° angle with the linear ball roller.

8. The sorting apparatus of claim 7, wherein the linear ball roller further comprises a high coefficient of friction surface adjacent to the set of ball platforms.

9. The sorting apparatus of claim 8, wherein the step of activating the motor causes the golf ball marking to rotate in a first plane and a second plane along the linear ball roller.

10. The sorting apparatus of claim 9, wherein the first plane is about parallel to a first loading prong of the pair of loading prongs, and the second plane is about parallel to a second loading prong of the pair of loading prongs.

11. The sorting apparatus of claim 10, wherein the set of ball platforms is made of polytetrafluoroethylene or polyoxymethylene.

12. The sorting apparatus of claim 11, wherein the linear ball roller supports a set of chain tensioners engaged with the chain assembly.

13. The sorting apparatus of claim 1, wherein the control system further comprises:

a classification controller, having a first memory of the set of memories, operably connected to the camera; and an activation timing controller, having a second memory of the set of memories in data communication with the classification controller and operably connected to the set of ball gates, the motor, and the set of sensors.

14. The sorting apparatus of claim 13, wherein the step of activating the ball gate further comprises:

analyzing the image classification to determine whether or not it is present in the first memory;

if not, then sending a first signal to the activation timing controller; and if so, then sending a second signal to the activation timing controller.

15. The sorting apparatus of claim 14, wherein the step of activating the ball gate further comprises:

incrementing a first counter upon sending the first signal; and incrementing a second counter upon sending the second signal.

16. The sorting apparatus of claim 15, wherein the step of activating the ball gate further comprises:

deactivating the motor when the second counter reaches a predetermined maximum number.

17. The sorting apparatus of claim 14, wherein the set of program instructions further comprises instructions that when executed, cause the activation timing controller to:

create a ball object, having a gate property and a remaining property, upon receipt of the first signal or the second signal;

push the ball object into a FIFO queue of ball objects;

activate the ball gate, of the set of ball gates, based on the second signal matching the gate property, and based on the ball present interrupt; and remove the ball object from the FIFO queue.

18. The sorting apparatus of claim 17, wherein the remaining property further comprises:

a list of ball gate numbers, each ball gate number corresponding to a ball gate of the set of ball gates; and the step of tracking the sequential ball position further comprises:

iteratively removing a ball gate number from the list of ball gate numbers, upon receipt of the ball present interrupt.

19. The sorting apparatus of claim 18, wherein the set of program instructions further comprises instructions, that when executed, causes the activation timing controller to:

send an error signal if the step of iteratively removing is not sequential.

20. A sorting apparatus for a set of golf balls comprising:

a frame;

a ball hopper supported by the frame;

a set of sort bins, above the ball hopper, supported by the frame;

a chain driven elevator, having a base positioned adjacent to the ball hopper, and an apex, mounted at an inclined angle to the frame;

a motor, operatively connected to the chain driven elevator;

a set of ball cups, each ball cup of the set of ball cups mounted to the chain driven elevator;

a camera, positioned to view at least one ball cup of the set of ball cups;

a gravity fed sorter divider, positioned adjacent to the apex and above the set of sort bins, and having a set of ball gates above and corresponding to the set of sort bins;

a set of sensors, corresponding to the set of ball gates, wherein each sensor of the set of sensors is operable to send a ball present interrupt;

a control system, having a set of memories, operatively connected to the motor, the camera, the set of sensors, and the set of ball gates;

the set of memories containing a set of program instructions, that when executed cause the control system to:

activate the motor;

receive an image from the camera of a golf ball marking on at least one golf ball of the set of golf balls;

derive an image classification of the image, using a convolutional neural network;

receive the ball present interrupt, corresponding to a sensor of the set of sensors;

track a sequential ball position, using the ball present interrupt; and activate a ball gate, of the set of ball gates, based on the image classification and the sequential ball position; and whereby a golf ball, of the set of golf balls, having the golf ball marking, is tracked, and is directed to a sort bin, of the set of sort bins, corresponding to the image classification;

wherein the gravity fed sorter divider further comprises a hollow tube forming an open path between the apex and the ball hopper.

21. The sorting apparatus of claim 20, wherein the hollow tube further comprises:

a first downward section, having a first subset of ball gates, of the set of ball gates, at about a 2.5° down angle;

a second downward section, having no ball gates, at about the 2.5° down angle; and a third downward section, having a second subset of ball gates, of the set of ball gates, at about the 2.5° down angle.

22. The sorting apparatus of claim 21, wherein the first downward section further comprises:

a ball entry receiver;

wherein the second downward section further comprises: a ball exit directed toward the ball hopper.

23. The sorting apparatus of claim 20, wherein each ball gate of the set of ball gates further comprises:

a ducted frame having a hollow interior;

an inlet and a first outlet, in the ducted frame, connected to the hollow tube; and a second outlet, in the ducted frame, connected to the inlet, and the first outlet, at a first oblique angle, and directed toward a sort bin of the set of sort bins, at a second oblique angle.

24. The sorting apparatus of claim 23, wherein the ducted frame further comprises:

a sensor, of the set of sensors, positioned to monitor the hollow interior, and operatively connected to the control system; and a movable gate member, impinging on the hollow interior, operatively connected to the control system.

25. The sorting apparatus of claim 24, wherein the movable gate member further comprises:

a gate arm pivotably attached to the ducted frame;

an actuator, contacting the gate arm; and whereby the gate arm is moved into the hollow interior.

26. A training apparatus for a convolutional neural network comprising:

a frame;

a ball hopper supported by the frame;

a chain driven elevator, having a base positioned adjacent to the ball hopper, and an apex, mounted at an inclined angle to the frame;

a motor, operatively connected to the chain driven elevator;

a set of ball cups, each ball cup of the set of ball cups mounted to the chain driven elevator;

a camera, positioned to view at least one ball cup of the set of ball cups;

a gravity fed tube, positioned adjacent the apex and the ball hopper;

a control system, having a set of memories, operatively connected to the motor and the camera;

wherein the set of memories contain a set of program instructions, that when executed, cause the control system to:

activate the motor;

receive an image from the camera, of a golf ball marking on at least one golf ball of a set of golf balls;

create a text annotation for the image;

store the text annotation and the image in a training file in the set of memories;

increment a training counter;

copy the training file to the set of memories; and train the convolutional neural network with the training file; and pause the motor when the training counter reaches a predetermined training iteration number.

* * * * *